(12) United States Patent
Takeuchi

(10) Patent No.: US 6,986,561 B2
(45) Date of Patent: Jan. 17, 2006

(54) SERIAL RECORDING APPARATUS, SERIAL RECORDING METHOD, AND COMPUTER-READABLE COMPUTER PROGRAM

(75) Inventor: Masaru Takeuchi, Handa (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 10/618,763

(22) Filed: Jul. 15, 2003

(65) Prior Publication Data

US 2004/0061732 A1 Apr. 1, 2004

(30) Foreign Application Priority Data

Jul. 17, 2002 (JP) ............................. 2002-208447

(51) Int. Cl.
*B41J 29/38* (2006.01)

(52) U.S. Cl. .................................................. 347/16
(58) Field of Classification Search .................. 347/16, 347/218, 5, 14; 346/134; 400/582, 709, 400/709.2
See application file for complete search history.

(56) References Cited

U.S. PATENT DOCUMENTS

| 4,097,873 | A | * | 6/1978 | Martin | ............................ | 347/3 |
| 6,126,345 | A | * | 10/2000 | Ito et al. | ....................... | 400/624 |
| 6,126,346 | A | * | 10/2000 | Hibino et al. | ................ | 400/636 |
| 6,428,224 | B1 | * | 8/2002 | Askren et al. | ............... | 400/582 |
| 6,520,700 | B1 | * | 2/2003 | Iwata | .......................... | 400/582 |
| 6,769,759 | B2 | * | 8/2004 | Yamasaki et al. | ............. | 347/41 |

2002/0044290 A1 * 4/2002 Otsuki ......................... 358/1.5

FOREIGN PATENT DOCUMENTS

| EP | 1195248 A1 * | 4/2002 |
| JP | A-62-119075 | 5/1987 |
| JP | A 1-232086 | 9/1989 |
| JP | 07314838 A * | 12/1995 |
| JP | A-8-192538 | 7/1996 |
| JP | A-9-150551 | 6/1997 |
| JP | B2 2815168 | 8/1998 |
| JP | A-11-334160 | 12/1999 |
| JP | A-2000-108432 | 4/2000 |
| JP | B2 3122314 | 10/2000 |

* cited by examiner

Primary Examiner—Thinh Nguyen
(74) Attorney, Agent, or Firm—Oliff & Berridge PLC

(57) ABSTRACT

A reference or standard pulse number, i.e., a standard number of pulses to be applied to a feeding motor to rotate a feeding roller and thereby feed a recording sheet, is set at Step S21. Subsequently, a feeding amount, A, needed by a recording head is calculated at Step S22, and a feeding amount, B, corresponding to an effective diameter of the feeding roller and the standard pulse number, is calculated at Step S23. Then, a differential pulse number to compensate for the difference between the feeding amounts A, B is determined at Step S24, and a unit error, R, between the feeding amount A and the sum of the feeding amount B (<A) and a feeding amount, C, corresponding to the differential pulse number is determined at Step S26. Subsequently, each time the feeding roller is driven, an accumulated error of the unit errors R is calculated at Step S27, and a number of drive pulses to be applied to the feeding motor is calculated, at Step S34, so that the accumulated error falls in a reference range. Finally, the feeding motor is operated according to the drive pulse number calculated at Step S34.

21 Claims, 11 Drawing Sheets

SERIAL RECORDING APPARATUS, SERIAL RECORDING METHOD, AND COMPUTER-READABLE COMPUTER PROGRAM

BACKGROUND OF THE INVENTION

1. Field of the Invention

The present invention relates to a serial (e.g., ink jet) recording apparatus, a serial recording method, and a serial recording program product each of which relates to the art of feeding, with a feeding roller, a recording medium and recording, with a recording head, an image on the recording medium.

2. Discussion of Related Art

There has conventionally been known an ink jet recording apparatus as a sort of serial recording apparatus that applies an ink to a recording sheet and thereby records an image on the sheet. The ink jet recording apparatus is employed as an image recording apparatus in, e.g., a facsimile apparatus or a printer apparatus.

Usually, the ink jet recording apparatus includes a recording head which has a plurality of ink jet recording elements arranged in one or more arrays in a sheet feeding direction and is mounted on a carriage that is moved by a drive source such as an electric motor in an image recording direction perpendicular to the sheet feeding direction; and a feeding roller which is driven or rotated by a drive source such as a stepper motor so as to feed the recording sheet in the feeding direction and thereby convey each portion of the sheet to a prescribed recording position where the recording head records a portion of an image on the each portion of the sheet.

When the image is recorded on the recording sheet, first, the feeding roller feeds the sheet to the recording position where the recording head is provided and, then, the respective recording elements of the head output respective inks toward the sheet while the head is moved in the recording direction.

Thus, an area where a portion of an image is recorded by one-time movement of the recording head in the recording direction is defined by a length in the feeding direction of the array of recording elements of the head, and is very narrow. Therefore, when a large image is recorded on a recording sheet, the feeding of each portion of the sheet by the feeding roller and the recording of each portion of the image by the recording head (i.e., the moving of the head in the recording direction and the outputting of the inks from the head) alternately occur.

When the large image is recorded on the recording sheet, as described above, it is needed to make an amount of feeding of the recording sheet by the feeding roller in the feeding direction (hereinafter, referred to as the "roller-feed amount"), equal to a length in the feeding direction of an image portion recorded on the sheet by one-time movement of the recording head in the recording direction, i.e., a length in the feeding direction of an area where inks are applied by the recording elements of the head to the sheet (hereinafter, referred to as the "head-record length").

However, the conventional ink jet recording apparatus suffers a problem that because of manufacturing errors of the array of recording elements of the recording head and manufacturing errors of the feeding roller, there occurs a difference between the roller-feed amount and the head-record length. Thus, an image-spaced portion, i.e., a white line, or an image-overlapped portion, i.e., a black line is produced when an image portion is recorded by one-time movement of the head in the recording direction and successively the next image portion is recorded by the next one-time movement of the head in the recording direction.

The above-indicated problem is explained by reference to FIGS. 9A, 9B, and 9C. In those figures, "A" indicates a head-record length and "B" indicates a roller-feed amount. FIG. 9A shows an inappropriate case where an image-spaced portion, i.e., a white line, "s", occurs to an image; FIG. 9C shows another inappropriate case where an image-overlapped portion, i.e., a black line, "u", occurs to an image; and FIG. 9B shows a normal case where no white or black line occurs.

The reason why the white line shown in FIG. 9A occurs is that the roller-feed amount B is greater than the head-record length A defined by the length in the feeding direction of the array of recording elements, and the reason why the black line shown in FIG. 9C occurs is that the roller-feed amount B is smaller than the head-record length A.

SUMMARY OF THE INVENTION

It is therefore an object of the present invention to provide a serial recording apparatus, a serial recording method, and a serial recording program product each of which can provide a high-quality recording of an image free from the problem that when an image is recorded on a recording medium by a plurality of times of movement of a recording head in a recording direction, an image-spaced portion, i.e., a white line, and/or an image-overlapped portion, i.e., a black line may occur to the image formed on the medium. This object may be achieved according to any one of the following modes of the present invention in the form of a serial recording apparatus, a serial recording method, and a serial recording program product, each of which is numbered like the appended claims and may depend from the other mode or modes, where appropriate, to indicate and clarify possible combinations of technical features. It is, however, to be understood that the present invention is not limited to the technical features or any combinations thereof that will be described below for illustrative purposes only. It is to be further understood that a plurality of features included in any one of the following modes of the invention are not necessarily provided altogether, and that the invention may be embodied without employing at least one of the features described with respect to each one of the modes.

(1) A serial recording apparatus, comprising a feeding device including a feeding roller and a drive source which rotates the feeding roller and thereby feeds a recording medium in a feeding direction; a recording head which records an image on the recording medium when the recording head is moved in a recording direction substantially perpendicular to the feeding direction and includes at least one array of recording elements arranged in a direction intersecting the recording direction; and a control device which controls, based on a length of the array of recording elements in the feeding direction and an effective diameter of the feeding roller, an amount of operation of the drive source, and thereby controls an amount of feeding of the recording medium in the feeding direction.

The serial recording apparatus is, e.g., an ink jet recording apparatus, or a serial thermal recording apparatus in which an ink ribbon is thermally fused by recording elements of a recording head so as to record an image on a recording medium.

In the serial recording apparatus according to the feature (1), the control device obtains, in advance, a length of an image in the feeding direction that is defined by the length of the array of recording elements, and a provisional amount of feeding in the feeding direction of the recording medium by the feeding roller that is defined by the effective diameter of the roller. Based on the length of image in the feeding direction and the provisional amount of feeding in the feeding direction of the recording medium, the control device controls the amount of operation of the drive source so that an actual length of a recorded image in the feeding direction is substantially equal to an actual amount of feeding in the feeding direction of the recording medium. Therefore, when an image is recorded on the recording medium by a plurality of times of movement of the recording head in a recording direction substantially perpendicular to the feeding direction, an image-spaced portion, i.e., a white line, or an image-overlapped portion, i.e., a black line does not occur to the image recorded on the medium. Thus, the recorded image enjoys a high quality.

For example, in the case where the drive source is provided by a stepper motor, the control device may increase or decrease a reference or standard number of drive pulses that are applied to the stepper motor to drive the same. Alternatively, in the case where the drive source is provided by a DC motor, it is possible to employ a rotary encoder that detects an amount of rotation of the DC motor (or the feeding roller), and measure a total amount of rotation of the feeding roller by counting a total number of pulse signals each of which is outputted by the rotary encoder each time the rotary encoder detects every pre-set amount of rotation of the DC motor (or the feeding roller). In the latter case, when the measured total amount of rotation of the feeding roller reaches a reference amount, the control device stops the DC motor. The control device may increase or decrease the reference amount of rotation of the DC motor.

(2) A serial recording apparatus, comprising a feeding device including a feeding roller and a drive source which rotates the feeding roller and thereby feeds a recording medium in a feeding direction; a recording head which records an image on the recording medium when the recording head is moved in a recording direction substantially perpendicular to the feeding direction and includes at least one array of recording elements arranged in a direction intersecting the recording direction; and a control device which controls, based on a length of the array of recording elements in the feeding direction and an effective diameter of the feeding roller, an amount of operation of the drive source, and thereby controls an amount of feeding of the recording medium in the feeding direction, each time the feeding device feeds the recording medium in the feeding direction.

The serial recording apparatus according to the feature (2) can record an image on the recording medium by a combination of a plurality of times of feeding of the recording medium in the feeding direction and a plurality of times of movement of the recording head in the recording direction. In this case, each time the feeding device feeds the recording medium in the feeding direction, the control device controls an amount of operation of the drive source based on the length in the feeding direction of the array of recording elements and the effective diameter of the feeding roller. Therefore, an image-spaced portion or an image-overlapped portion does not occur between an image portion (or an image line) formed by one-time movement of the recording head in the recording direction and the next image portion (or the next image line) formed by the next one-time movement of the head in the same direction. Thus, the image recorded on the recording medium enjoys a high degree of quality.

Like the control device employed by the serial recording apparatus according to the feature (1), the control device employed by the serial recording apparatus according to the feature (2) can increase or decrease, if the drive source is provided by a stepper motor, a reference number of drive pulses to be applied to the stepper motor. Alternatively, if the drive source is provided by a DC motor, the control device can increase or decrease a reference amount of operation of the DC motor that is used to stop the operation of the DC motor.

(3) The apparatus according to the feature (1) or (2), wherein the control device comprises a correcting portion which determines a difference between the length of the array of recording elements in the feeding direction and a provisional amount of feeding of the recording medium obtained based on the effective diameter of the feeding roller and a reference amount of operation of the drive source, and corrects, based on the determined difference, the reference amount of operation of the drive source into a corrected amount of operation of the drive source, so that the feeding device feeds the recording medium by a corrected feeding amount corresponding to the corrected amount of operation of the drive source.

In the serial recording apparatus according to the feature (3), the correcting portion of the control device determines a difference between the length in the feeding direction of the array of recording elements and a provisional amount of feeding of the recording medium obtained based on the effective diameter of the feeding roller and a reference amount of operation of the drive source (corresponding to a reference amount (or angle) of rotation of the feeding roller), and corrects, based on the thus determined difference, the reference amount of operation of the drive source, so that the feeding device feeds the recording medium by a corrected feeding amount corresponding to the thus corrected amount of operation of the drive source and the above-indicated difference is decreased. Therefore, an image-spaced portion or an image-overlapped portion does not occur between an image portion formed by one-time movement of the recording head in the recording direction and the next image portion formed by the next one-time movement of the head in the same direction. Thus, the image recorded on the recording medium enjoys a high degree of quality.

(4) The apparatus according to the feature (3), wherein the correcting portion modifies, based on a sort of the recording medium, a measured diameter of the feeding roller, into the effective diameter, and determines the difference between the length of the array of recording elements and the provisional amount of feeding of the recording medium obtained based on the effective diameter of the feeding roller and the reference amount of operation of the drive source.

In this case, the term "effective diameter" of the feeding roller is used to encompass influences of both the manufacturing errors of the roller and the specific sort of the recording medium used. If the measured diameter of the feeding roller can be regarded as an effective diameter of the roller corresponding to a certain sort of recording medium, the measured diameter may be used as the effective diameter for that sort of recording medium.

According to the feature (4), different amounts of feeding of the recording medium corresponding to different sorts of recording media such as a plain-paper sheet, a glossy-paper sheet and an OHP sheet are obtained in advance. In this case, the correcting portion modifies, based on the sort of the recording medium used, a measured diameter of the feeding roller into the effective diameter, and determines the difference between the length in the feeding direction of the array of recording elements and the provisional amount of feeding of the recording medium based on the effective diameter of the feeding roller and the reference amount of operation of the drive source. Therefore, even if different sorts of recording media may be used with the present recording apparatus, an image-spaced portion or an image-overlapped portion does not occur between an image portion formed on each sort of recording medium by one-time movement of the recording head in the recording direction and the next image portion formed by the next one-time movement of the head in the same direction. Thus, the image recorded on each sort of recording medium enjoys a high degree of quality.

(5) The apparatus according to any of the features (2) through (4), wherein the control device comprises a correcting portion which determines, each time the feeding device feeds the recording medium, an accumulated error of feeding of the recording medium by the feeding device relative to the recording head, and corrects a reference amount of operation of the drive source into a corrected amount of operation of the drive source, so that the feeding device feeds the recording medium by a corrected feeding amount corresponding to the corrected amount of operation of the drive source and the accumulated error falls in a reference range.

In the serial recording apparatus according to the feature (5), the correcting portion determines, each time the feeding device feeds the recording medium, an accumulated error of feeding of the recording medium by the feeding device relative to the recording head, and corrects, when the determined accumulated error does not fall in a reference range, i.e., a predetermined permissible range, the reference amount of operation of the drive source into the corrected amount of operation of the drive source, so that the feeding device feeds the recording medium by a corrected feeding amount corresponding to the corrected amount of operation of the drive source and the accumulated error falls in the reference range. Thus, even if a plurality of times of feeding of the recording medium in the feeding direction and a plurality of times of movement of the recording head in the recording direction may be combined to record an image on the recording medium, an image-spaced portion or an image-overlapped portion does not occur between an image portion formed by one-time movement of the recording head in the recording direction and the next image portion formed by the next one-time movement of the head in the same direction. Thus, the image recorded on the recording medium enjoys a high degree of quality.

More specifically explained, the accuracy of correction of the feeding amount of recording medium relative to the recording head depends on the smallest unit amount of recording medium that can be fed by the feeding device, i.e., the smallest unit amount of operation of the drive source of the feeding device. Therefore, after the recording medium is fed by the corrected feeding amount by the feeding device, a correcting error that is, however, smaller than the smallest unit amount of feeding of recording medium remains. Those correcting errors are accumulated as the feeding of recording medium is repeated, and eventually an image-spaced portion or an image-overlapped portion will occur. However, in the serial recording apparatus according to the feature (5), the correcting portion determines, each time the feeding roller is driven, the accumulated error of feeding of the recording medium relative to the recording head, and corrects the reference amount of operation of the drive source into a corrected amount of operation of the drive source, so that the feeding device feeds the recording medium by a corrected feeding amount corresponding to the corrected amount of operation of the drive source and the accumulated error falls in the reference range. Therefore, the image recorded on the recording medium enjoys a high degree of quality.

(6) The apparatus according to the feature (5), each time before the feeding device feeds the recording medium, the correcting portion determines the accumulated error, and corrects, when the determined accumulated error does not fall in the reference range, the reference amount of operation of the drive source into the corrected amount of operation of the drive source.

In the serial recording apparatus according to the feature (6), before the feeding device feeds the recording medium for recording of the next image portion on the medium, the correcting portion determines the accumulated error, in advance, and corrects the reference amount of operation of the drive source into a corrected amount of operation of the drive source, so that the feeding device feeds the recording medium by a corrected feeding amount corresponding to the corrected amount of operation of the drive source and the accumulated error falls in the reference range. Therefore, even if an image may be recorded by the combination of a plurality of times of feeding of the recording medium in the feeding direction and a plurality of times of movement of the recording head in the recording direction, an image-spaced portion or an image-overlapped portion does not occur between an image portion formed by one-time movement of the recording head in the recording direction and the next image portion formed by the next one-time movement of the head in the same direction. Thus, the image recorded on the recording medium enjoys a high degree of quality.

(7) The apparatus according to the feature (5) or (6), wherein the correcting portion determines, each time the feeding device feeds the recording medium, a difference by subtracting the length of the array of recording elements from a provisional amount of feeding of the recording medium obtained based on the effective diameter of the feeding roller and the reference amount of operation of the drive source, divides the determined difference by a smallest unit amount of the recording medium that can be fed by the feeding device, into an integer as a quotient and a remainder whose absolute value is smaller than the smallest unit amount of feeding of the recording medium, and determines the accumulated error which is equal to a product of the remainder and one plus a number of times by which the feeding device has fed the recording medium, wherein when the accumulated error is greater than an upper limit of the reference range, the correcting portion corrects the reference amount of operation of the drive source, by subtracting, from the reference amount of operation of the drive source, a first correction amount of operation of the drive source corresponding to a first product of a first positive integer and the smallest unit amount of feeding of the recording medium and, when the accumulated error is smaller than a lower limit of the reference range, the correcting portion corrects the reference amount of operation of the drive source, by adding, to the reference amount of operation of the drive source, a second correction amount of operation of the drive source corresponding to a second product of a second positive integer and the smallest unit amount of feeding of the recording medium, and wherein the correcting portion updates the accumulated error, by subtracting, when the accumulated error is greater than the upper limit of the reference range, the first product from the accumulated error and adding, when the accumulated error is smaller than the lower limit of the reference range, the second product to the accumulated error.

In the serial recording apparatus according to the feature (7), the correcting portion corrects the reference amount of operation of the drive source, by subtracting or adding, from or to the reference amount of operation of the drive source, a correction amount of operation of the drive source corresponding to a product of a positive integer and the smallest unit amount of feeding of recording medium, so that the accumulated error falls in the reference range. Therefore, the amount of feeding of recording medium can be accurately controlled based on the smallest unit amount of feeding of recording medium.

(8) The apparatus according to the feature (7), wherein the upper limit of the reference range is equal to a product of +½ and the smallest unit amount of feeding of the recording medium, and the lower limit of the reference range is equal to a product of −½ and the smallest unit amount of feeding of the recording medium.

In the serial recording apparatus according to the feature (8), the upper and lower limits of the reference range used for comparison with the accumulated error are equal to the product of +½ and the smallest unit amount of feeding of recording medium and the product of −½ and the smallest unit amount of feeding of recording medium, respectively. Thus, the accuracy of feeding of recording medium by the feeding device relative to the recording head depends on just half the smallest unit amount of feeding of recording medium. Thus, the recording of image by the recording elements of the head enjoys a high degree of accuracy.

(9) The apparatus according to the feature (8), wherein each of the first and second integers is equal to 1, wherein when the accumulated error is greater than the upper limit of the reference range, the correcting portion corrects the reference amount of operation of the drive source, by subtracting, from the reference amount of operation of the drive source, the first correction amount of operation of the drive source corresponding to the smallest unit amount of feeding of the recording medium and, when the accumulated error is smaller than the lower limit of the reference range, the correcting portion corrects the reference amount of operation of the drive source, by adding, to the reference amount of operation of the drive source, the second correction amount of operation of the drive source corresponding to the smallest unit amount of feeding of the recording medium, and wherein the correcting portion updates the accumulated error, by subtracting, when the accumulated error is greater than the upper limit of the reference range, the first product equal to the smallest unit amount of feeding of the recording medium, from the accumulated error and adding, when the accumulated error is smaller than the lower limit of the reference range, the second product equal to the smallest unit amount of feeding of the recording medium, to the accumulated error.

In the serial recording apparatus according to the feature (9), the correcting portion corrects the reference amount of operation of the drive source by subtracting or adding, from or to the reference amount of operation of the drive source, a correction amount of operation of the drive source corresponding to the smallest unit amount of feeding of recording medium. Therefore, in the case where the correction amount of operation of the drive source is subtracted from the reference amount of operation of the drive source, the updated accumulator error is greater than the lower limit of the reference range; and in the case where the correction amount of operation of the drive source is added to the reference amount of operation of the drive source, the updated accumulated error is smaller than the upper limit of the reference range. Thus, the updated accumulator error always falls in the reference range. Therefore, even if an image may be recorded by the combination of a plurality of times of feeding of the recording medium in the feeding direction and a plurality of times of movement of the recording head in the recording direction, an image-spaced portion or an image-overlapped portion does not occur between an image portion formed by onetime movement of the recording head in the recording direction and the next image portion formed by the next one-time movement of the head in the same direction. Thus, the image recorded on the recording medium enjoys a high degree of quality.

(10) The apparatus according to any of the features (1) to (9), further comprising a recording-mode selecting device which is operable to select one of a plurality of recording modes corresponding to different resolutions of recording.

In the serial recording apparatus according to the feature (10), the recording-mode selecting device is operable for selecting one of different recording modes having different degrees of definition of recorded image. The recording modes may be a draft mode, a normal mode, a fine mode, and a superfine mode. Thus, the present recording apparatus can be efficiently used by the user to record an image in a desired recording mode.

(11) The apparatus according to any of the features (1) through (10), wherein the recording head comprises an ink jet recording head including at least one array of ink jet recording elements each of which outputs an ink toward the recording medium to record the image thereon. Alternatively, the recording head may comprise a serial thermal recording head.

(12) The apparatus according to any of the features (1) through (11), wherein the control device controls, based on at least one of a measured length of the array of recording elements in the feeding direction and a measured diameter of the feeding roller, the amount of operation of the drive source, and thereby controls the amount of feeding of the recording medium in the feeding direction.

In the case where either the manufacturing errors of the array of recording elements of the recording head or the manufacturing errors of the feeding roller are negligible, the control device can control the amount of operation of the drive source, based on the measured length of the array of recording elements in the feeding direction and a designed or nominal diameter of the feeding roller, or based on a designed or nominal length of the array of recording elements in the feeding direction and the measured diameter of the feeding roller.

(13) The apparatus according to the feature (12), wherein the control device controls, based on the measured length of the array of recording elements in the feeding direction and the measured diameter of the feeding roller, the amount of operation of the drive source, and thereby controls the amount of feeding of the recording medium in the feeding direction.

In this case, an actual length of the array of recording elements in the feeding direction and/or an actual diameter of the feeding roller may be measured, in advance, and stored in a memory of the control device.

(14) A serial recording method, comprising the steps of feeding, with a feeding roller and a drive source which rotates the feeding roller, a recording medium in a feeding direction, recording, with a recording head, an image on the recording medium when the recording head is moved in a recording direction substantially perpendicular to the feeding direction, the recording head including at least one array of recording elements arranged in a direction intersecting the recording direction, and controlling, based on a length of the array of recording elements in the feeding direction and an effective diameter of the feeding roller, an amount of operation of the drive source, and thereby controlling an amount of feeding of the recording medium in the feeding direction.

The serial recording method according to the feature (14) enjoys the same advantages as those of the serial recording apparatus according to the feature (1). That is, an image-spaced portion or an image-overlapped portion does not occur between an image portion formed by one-time movement of the recording head in the recording direction and the next image portion formed by the next one-time movement of the head in the same direction. Thus, the image recorded on the recording medium enjoys a high degree of quality.

(15) A serial recording method, comprising the steps of feeding, with a feeding roller and a drive source which rotates the feeding roller, a recording medium in a feeding direction, recording, with a recording head, an image on the recording medium when the recording head is moved in a recording direction substantially perpendicular to the feeding direction, the recording head including at least one array of recording elements arranged in a direction intersecting the recording direction, and controlling, based on a length of the array of recording elements in the feeding direction and an effective diameter of the feeding roller, an amount of operation of the drive source, and thereby controlling an amount of feeding of the recording medium in the feeding direction, each time the recording medium is fed in the feeding direction.

The serial recording method according to the feature (15) enjoys the same advantages as those of the serial recording apparatus according to the feature (2). That is, an image-spaced portion or an image-overlapped portion does not occur between an image portion formed by one-time movement of the recording head in the recording direction and the next image portion formed by the next one-time movement of the head in the same direction. Thus, the image recorded on the recording medium enjoys a high degree of quality.

(16) The method according to the feature (14), wherein the step of controlling comprises determining a difference between the length of the array of recording elements in the feeding direction and a provisional amount of feeding of the recording medium obtained based on the effective diameter of the feeding roller and a reference amount of operation of the drive source, and correcting, based on the determined difference, the reference amount of operation of the drive source into a corrected amount of operation of the drive source, so that the recording medium is fed by a corrected feeding amount corresponding to the corrected amount of operation of the drive source.

The serial recording method according to the feature (16) enjoys the same advantages as those of the serial recording apparatus according to the feature (3). That is, an image-spaced portion or an image-overlapped portion does not occur between an image portion formed by one-time movement of the recording head in the recording direction and the next image portion formed by the next one-time movement of the head in the same direction. Thus, the image recorded on the recording medium enjoys a high degree of quality.

This serial recording method may comprise an additional step of modifying, based on based on a sort of the recording medium, a measured diameter of the feeding roller, into the effective diameter, and determining a difference between the length of the array of recording elements and a provisional amount of feeding of the recording medium obtained based on the effective diameter of the feeding roller and a reference amount of operation of the drive source. In this case, the reference amount of operation of the drive source is corrected, based on the thus determined difference, into a corrected amount of operation of the drive source, and the feeding medium is fed by a corrected feeding amount corresponding to the corrected amount of operation of the drive source. This serial recording method enjoys the same advantages of the serial recording apparatus according to the feature (4).

(17) The method according to the feature (15), wherein the step of controlling comprises determining, each time the recording medium is fed, an accumulated error of feeding of the recording medium relative to the recording head, and correcting a reference amount of operation of the drive source into a corrected amount of operation of the drive source, so that the recording medium is fed by a corrected feeding amount corresponding to the corrected amount of operation of the drive source and the accumulated error falls in a reference range.

The serial recording method according to the feature (17) enjoys the same advantages as those of the serial recording apparatus according to the feature (5). That is, an image-spaced portion or an image-overlapped portion does not occur between an image portion formed by one-time movement of the recording head in the recording direction and the next image portion formed by the next one-time movement of the head in the same direction. Thus, the image recorded on the recording medium enjoys a high degree of quality.

In this serial recording method, each time before the recording medium is fed, the accumulated error may be determined and, if the accumulated error does not fall in the reference range, the reference amount of operation of the drive source may be corrected into the corrected amount of operation of the drive source. This serial recording method enjoys the same advantages as those of the serial recording apparatus according to the feature (6).

This serial recording method may comprise an additional step of correcting, when the accumulated error is greater than an upper limit of the reference range, the reference amount of operation of the drive source, by subtracting, from the reference amount of operation of the drive source, a first correction amount of operation of the drive source corresponding to a first product of a first positive integer and the smallest unit amount of the recording medium that can be fed by the feeding roller and, correcting, when the accumulated error is smaller than a lower limit of the reference range, the reference amount of operation of the drive source, by adding, to the reference amount of operation of the drive source, a second correction amount of operation of the drive source corresponding to a second product of a second positive integer and the smallest unit amount of feeding of the recording medium. This serial recording method enjoys the same advantages as those of the serial recording apparatus according to the feature (7).

In this serial recording method, the upper limit of the reference range may be equal to the product of $+\frac{1}{2}$ and the smallest unit amount of feeding of recording medium, and the lower limit of the reference range may be equal to the product of $-\frac{1}{2}$ and the smallest unit amount of feeding of recording medium. This serial recording method enjoys the same advantages as those of the serial recording apparatus according to the feature (8).

In this serial recording method, each of the first and second integers may be equal to one, and the reference amount of operation of the drive source may be corrected by subtracting or adding, from or to the reference amount of operation, a correction amount of operation of the drive source corresponding to the smallest unit amount of feeding of recording medium. This serial recording method enjoys the same advantages as those of the serial recording apparatus according to the feature (9).

This serial recording method may comprise an additional step of selecting one of a plurality of recording modes corresponding to different recording resolutions. This serial recording method enjoys the same advantages as those of the serial recording apparatus according to the feature (10).

(18) The method according to the feature (14), wherein the step of recording comprises recording the image on the recording medium, with an ink jet recording head including at least one array of ink jet recording elements each of which outputs an ink toward the recording medium.

(19) A computer-readable computer program product containing a computer program for carrying out a serial recording method, the method including the steps of feeding, with a feeding roller and a drive source which rotates the feeding roller, a recording medium in a feeding direction, recording, with a recording head, an image on the recording medium when the recording head is moved in a recording direction substantially perpendicular to the feeding direction, the recording head including at least one array of recording elements arranged in a direction intersecting the recording direction, and controlling, based on a length of the array of recording elements in the feeding direction and an effective diameter of the feeding roller, an amount of operation of the drive source, and thereby controlling an amount of feeding of the recording medium in the feeding direction.

The serial recording program according to the feature (19) operates the serial recording apparatus according to the feature (1) and thereby enjoys the same advantages as those of the serial recording apparatus according to the feature (1). For example, in the case where the serial recording apparatus according to the feature (1) employs a computer as an element thereof, the serial recording program may be read and implemented by the computer. This recording program may be recorded on a recording medium that is readable by a computer, such as a ROM, a RAM, a hard disc, a CD-ROM, or an optical disc, so that the program may be read out to operate the serial recording apparatus.

(20) A computer-readable computer program product containing a computer program for carrying out a serial recording method, the method including the steps of feeding, with a feeding roller and a drive source which rotates the feeding roller, a recording medium in a feeding direction, recording, with a recording head, an image on the recording medium when the recording head is moved in a recording direction substantially perpendicular to the feeding direction, the recording head including at least one array of recording elements arranged in a direction intersecting the recording direction, and controlling, based on a length of the array of recording elements in the feeding direction and an effective diameter of the feeding roller, an amount of operation of the drive source, and thereby controlling an amount of feeding of the recording medium in the feeding direction, each time the recording medium is fed in the feeding direction.

The serial recording program according to the feature (20) operates the serial recording apparatus according to the feature (2) and thereby enjoys the same advantages as those of the serial recording apparatus according to the feature (2).

(21) The product according to the feature (19) or (20), wherein the step of controlling comprises determining a difference between the length of the array of recording elements in the feeding direction and a provisional amount of feeding of the recording medium obtained based on the effective diameter of the feeding roller and a reference amount of operation of the drive source, and correcting, based on the determined difference, the reference amount of operation of the drive source into a corrected amount of operation of the drive source, so that the recording medium is fed by a corrected feeding amount corresponding to the corrected amount of operation of the drive source. The serial recording program according to the feature (21) is preferably used to operate the serial recording apparatus according to the feature (3) and thereby enjoy the same advantages as those of the serial recording apparatus according to the feature (3).

This serial recording program may comprise an additional step of modifying, based on based on a sort of the recording medium, a measured diameter of the feeding roller into the effective diameter of the roller, and determining a difference between the length of the array of recording elements and a provisional amount of feeding of the recording medium obtained based on the effective diameter of the feeding roller and a reference amount of operation of the drive source. In this case, the reference amount of operation of the drive source is corrected, based on the thus determined difference, into a corrected amount of operation of the drive source, and the feeding medium is fed by a corrected amount corresponding to the corrected amount of operation of the drive source. Thus, this serial recording program enjoys the same advantages as those of the serial recording apparatus according to the feature (4).

(22) The product according to the feature (20), wherein the step of controlling comprises determining, each time the recording medium is fed, an accumulated error of feeding of the recording medium relative to the recording head, and correcting the reference amount of operation of the drive source into a corrected amount of operation of the drive source, so that the recording medium is fed by a corrected feeding amount corresponding to the corrected amount of operation of the drive source and the accumulated error falls in a reference range.

The serial recording program according to the feature (22) operates the serial recording apparatus according to the feature (5) and thereby enjoys the same advantages as those of the ink jet recording apparatus according to the feature (5).

In this serial recording program, each time before the recording medium is fed, the accumulated error may be determined and, if the accumulated error does not fall in the reference range, the reference amount of operation of the drive source may be corrected into the corrected amount of operation of the drive source. This serial recording program enjoys the same advantages as those of the serial recording apparatus according to the feature (6).

This serial recording program may comprise an additional step of correcting, when the accumulated error is greater than an upper limit of the reference range, the reference amount of operation of the drive source, by subtracting, from the reference amount of operation of the drive source, a first correction amount of operation of the drive source corresponding to a first product of a first positive integer and the smallest unit amount of the recording medium that can be fed by the feeding roller and, correcting, when the accumulated error is smaller than a lower limit of the reference range, the reference amount of operation of the drive source, by adding, to the reference amount of operation of the drive source, a second correction amount of operation of the drive source corresponding to a second product of a second positive integer and the smallest unit amount of feeding of the recording medium. This serial recording program enjoys the same advantages as those of the serial recording apparatus according to the feature (7).

In this serial recording program, the upper limit of the reference range may be equal to the product of +½ and the smallest unit amount of feeding of recording medium, and the lower limit of the reference range may be equal to the product of −½ and the smallest unit amount of feeding of recording medium. This serial recording program enjoys the same advantages as those of the serial recording apparatus according to the feature (8).

In this serial recording program, each of the first and second integers may be equal to one, and the reference amount of operation of the drive source may be corrected by subtracting or adding, from or to the reference amount of operation, a correction amount of operation of the drive source corresponding to the smallest unit amount of feeding of recording medium. This serial recording program enjoys the same advantages as those of the serial recording apparatus according to the feature (9).

This serial recording program may comprise an additional step of selecting one of a plurality of recording modes corresponding to different recording resolutions. This serial recording program enjoys the same advantages as those of the serial recording apparatus according to the feature (10).

(23) The product according to any of the features (19) to (22), wherein the step of recording comprises recording the image on the recording medium, with an ink jet recording head including at least one array of ink jet recording elements each of which outputs an ink toward the recording medium.

(24) The product according to any of the features (19) to (23), wherein the product is either a recording medium on which the computer program is recorded, or a carrier wave in which the computer program is embodied as a data signal.

BRIEF DESCRIPTION OF THE DRAWINGS

The above and optional objects, features, and advantages of the present invention will be better understood by reading the following detailed description of the preferred embodiments of the invention when considered in conjunction with the accompanying drawings, in which.

DETAILED DESCRIPTION OF THE PREFERRED EMBODIMENTS

Hereinafter, there will be described a facsimile apparatus 201 including an ink jet recording apparatus as a sort of serial recording apparatus to which the present invention is applied and which performs an ink jet recording method as a sort of serial recording method to which the present invention is also applied, according to an ink jet recording program product as a sort of serial recording program product to which the present invention is also applied. First, the construction of the facsimile apparatus 201 is described, below.

Figure 1:
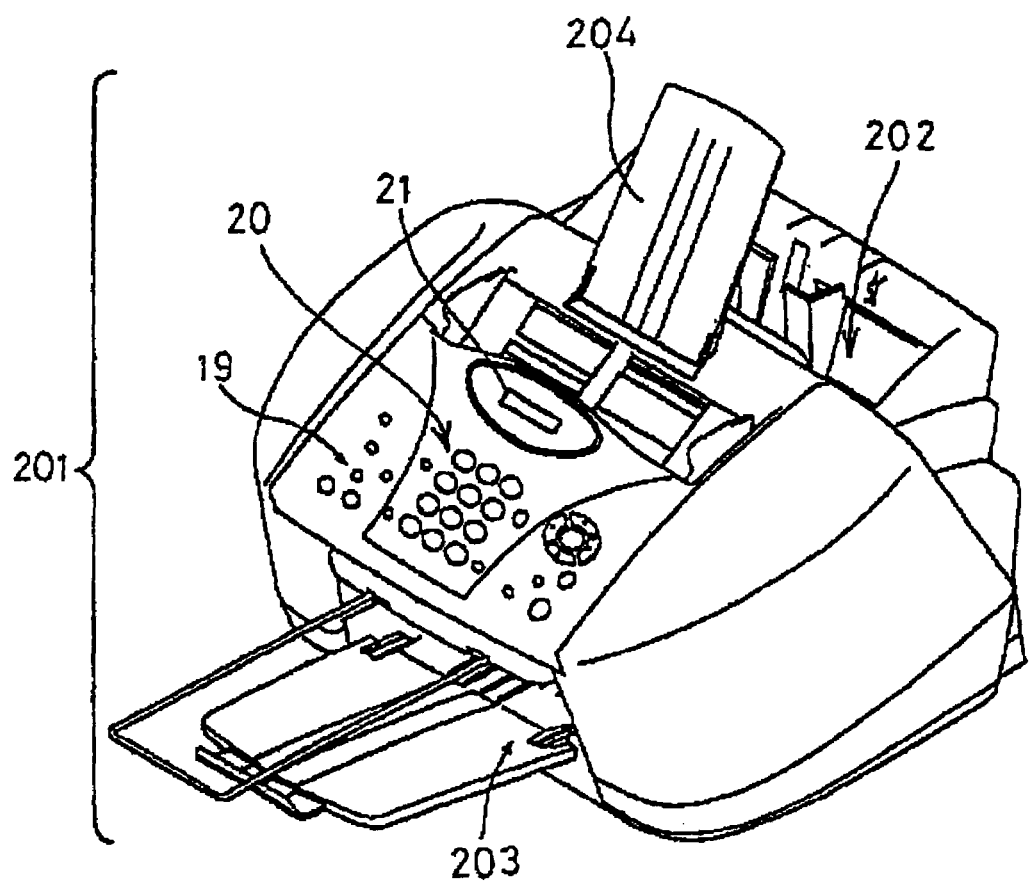
FIG. 1 is a perspective view of an external appearance of a facsimile apparatus to which the present invention is applied.

FIG. 1 is a view for explaining an exterior appearance of the facsimile apparatus 201. The facsimile apparatus 201 is used for receiving, via a telephone line, image data from another (e.g., remote) facsimile apparatus and recording, based on the received image data, an image on a recording sheet as a sort of recording medium, and additionally reading, with a scanner as part of a reading portion 18 (shown in FIG. 3), an image recorded on a recording sheet and transmitting image data representing the read image to another facsimile apparatus via the telephone line.

The facsimile apparatus 201 has, in its top surface, a panel interface 19 including a liquid crystal display (LCD) 21 and a keyboard 20 having various keys including a recording mode selecting key operable for selecting one of a plurality of recording modes such as a normal mode, a draft mode, a fine mode, and a superfine mode; and a recording-medium selecting key operable for selecting one of a plurality of sorts of recording media such as a plain-paper sheet, a glossy-paper sheet, and an over-head-projector (OHP) sheet. In addition, the facsimile apparatus 201 has, in rear of the panel interface 19, a sheet stacker 202 for stacking or storing recording sheets on each of which the facsimile apparatus 201 is to record an image received from another facsimile apparatus via the telephone line, and has, in front of the panel interface 19, an outlet tray 203 for collecting the recording sheets which are discharged from the facsimile apparatus 201 and on each of which an image, such as characters, has been recorded. Reference numeral 204 designates an original insertion portion 204 in which a user inserts an original on which an image is recorded, so that the scanner reads the image and the facsimile apparatus 201 transmits image data representing the read image, to another facsimile apparatus via the telephone line.

The keys of the keyboard 20 of the panel interface 19 additionally include dial keys operable for dialing; a memory key operable for retrieving necessary data from a memory; a start key operable for starting a facsimile transmission operation; and a stop key operable for stopping a facsimile transmission operation.

The facsimile apparatus 201 has, in its rear side surface, a parallel interface 24 (shown in FIG. 3) to which a parallel cable can be connected for the purpose of transmitting, and receiving, data to, and from, a personal computer 300 (hereinafter, abbreviated to "PC" 300; shown in FIG. 10); a USB (universal serial bus) interface 25 (shown in FIG. 3) to which a USB cable can be connected for the same purpose;

and a slot 23 (shown in FIG. 3) to, and from, which a memory such as a magnetic disk in which to-be-transmitted data or received data are recorded can be attached, and detached.

The recording sheets as the recording media that are stored in the sheet stacker 202 may be plain-paper sheets, glossy-paper sheets, or OHP (over-head-projector) sheets. When the facsimile apparatus 201 receives image data via the telephone line, first, the LCD 21 displays an indication informing the user of the reception of the image data, and then one recording sheet is supplied to the facsimile apparatus 201 so that an image represented by the received image data is recorded on the recording sheet and the image-recorded sheet is discharged into the outlet tray 203.

Figure 2:
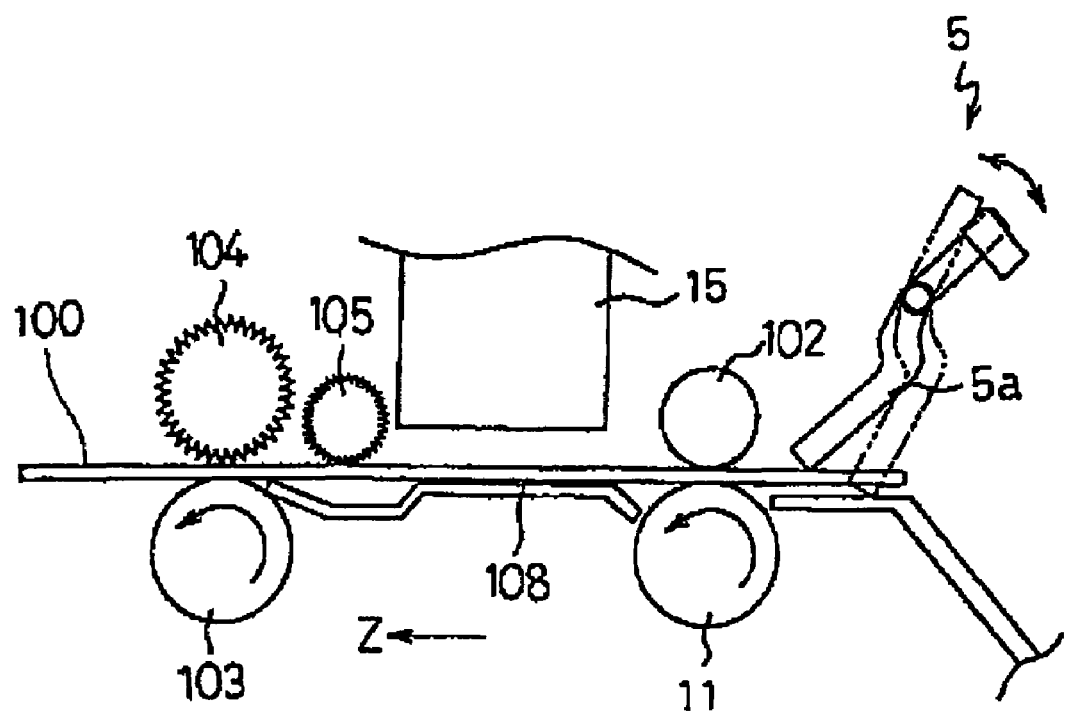
FIG. 2 is a schematic view showing a construction of a recording-sheet feeding device of the facsimile apparatus.

FIG. 2 is an illustrative view showing an interior construction of the facsimile apparatus 201, more specifically described, a recording head 15 and a feeding device which feeds a recording sheet 100 in a feeding direction substantially perpendicular to a recording direction in which the recording head 15 is moved to record an image on the recording sheet 100. As shown in FIG. 2, in the present facsimile apparatus 201, the feeding device includes a feeding roller 11; a secondary roller 102 which is opposed to the feeding roller 11 and cooperates with the feeding roller 11 to pinch the recording sheet 100 and feed the sheet 100 in the feeding direction; a discharging roller 103 which discharges the recording sheet 100 toward the outlet tray 203; and a secondary roller 104 which is dependently rotated with the discharging roller 103; and a sheet-end sensor 5 which detects a leading end and a trailing end of the recording sheet 100 and supplies a position signal representing the position of the detected leading or trailing end of the recording sheet 100, to a control system that will be described later.

A platen 108 is opposed to the recording head 15, and contacts a lower surface of the recording sheet 100. Thus, the distance between the recording sheet 100 and the recording head 15 can be stably maintained. The recording head 15 includes one or more arrays of ink jet recording elements which are arranged in the feeding direction (i.e., a Z direction) and which output respective inks toward the recording sheet 100 to record an image on the sheet 100.

The feeding device additionally includes a rotatable spur wheel 105 which engages an upper surface of the recording sheet 100 to stably maintain a height position of the recording sheet 100 on which the image has been recorded by the recording head 15. A circumferential surface of each of the spur wheel 105 and the secondary roller 104 is provided with teeth each of which has an acute apex angle, so as to minimize the area in which the each member 105, 104 contacts the image recorded on the recording sheet 100 and thereby prevent lowering of quality of the recorded image.

Figure 3:
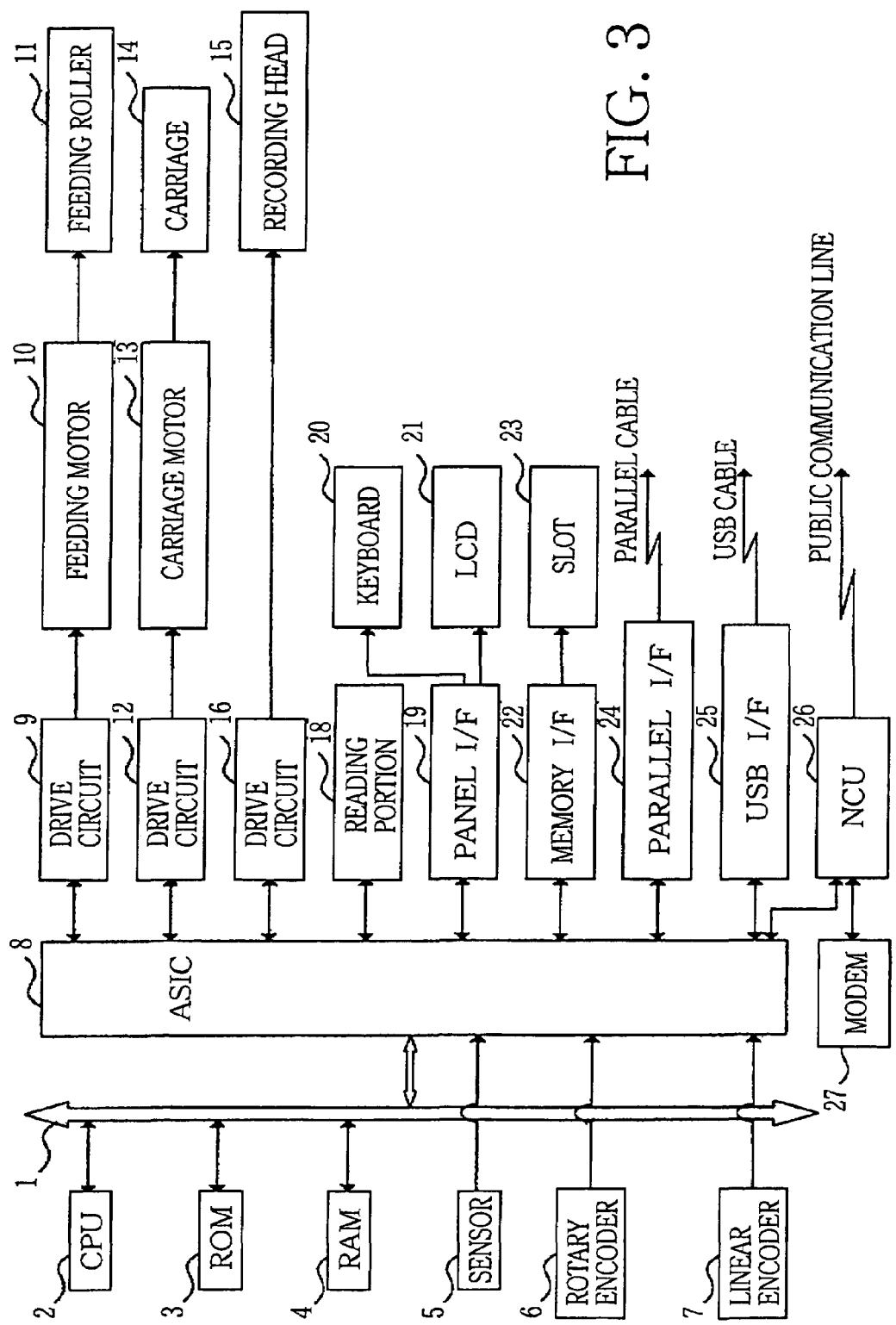
FIG. 3 is a diagrammatic view showing a construction of the facsimile apparatus.

The feeding roller 11 is driven or rotated by a drive source in the form of a feeding motor (e.g., an LF motor) 10 (shown in FIG. 3). The feeding roller 11 is connected to an output shaft of the feeding motor 10 via gears and a belt (all not shown). The recording head 15 is fixedly mounted on a carriage 14 (shown in FIG. 3) which is moved by a carriage motor 13 (e.g., a CR motor) in the recording direction substantially perpendicular to the feeding direction (i.e., the Z direction).

In the facsimile apparatus 201, the feeding device constructed as described above is operated for recording an image on a recording sheet 100, as follows: When the recording sheet 100 is supplied from the sheet stacker 202, a leading end of the sheet 100 contacts an arm 5a of the sheet-end sensor 6 and rotates the arm 5a, so that the sensor 5 supplies a position signal representing a position of the detected leading end of the sheet 100, to the control system, described later. Then, under control of command signals supplied from the control system, the recording sheet 100 is fed, and the image is recorded on the sheet 100, as described below.

The recording sheet 100 is pinched by the feeding roller 11 and the secondary roller 102 that is dependently rotated by rotation of the feeding roller 11 and, when the feeding roller 11 is driven or rotated by the feeding motor 10, the recording sheet 100 is fed to a prescribed position where the recording head 15 is provided. Then, while the recording head 16 is moved in the recording direction, the recording elements of the head 15 output respective inks toward the recording sheet 100 so as to record the image on the sheet 100.

In the case where a large image is recorded on the recording sheet 100, the feeding of the sheet 100 by the feeding roller 11 in the feeding direction and the recording of the image by the recording head 15 (i.e., the moving of the head 16 in the recording direction and the outputting of inks from the recording elements) are alternately repeated. To this end, an amount of one-time feeding of the recording sheet 100 by the feeding roller 11 in the feeding direction, and a length in the feeding direction of an image-recorded portion of the sheet 100 on which a portion of the image is recorded by one-time movement of the recording head 15 in the recording direction are made substantially equal to each other by controlling an amount of one-time operation of the feeding motor 10 based on a length in the feeding direction of the array of recording elements of the recording head 15 and an effective diameter of the feeding roller 11, as explained in more detail below.

Figure 8:
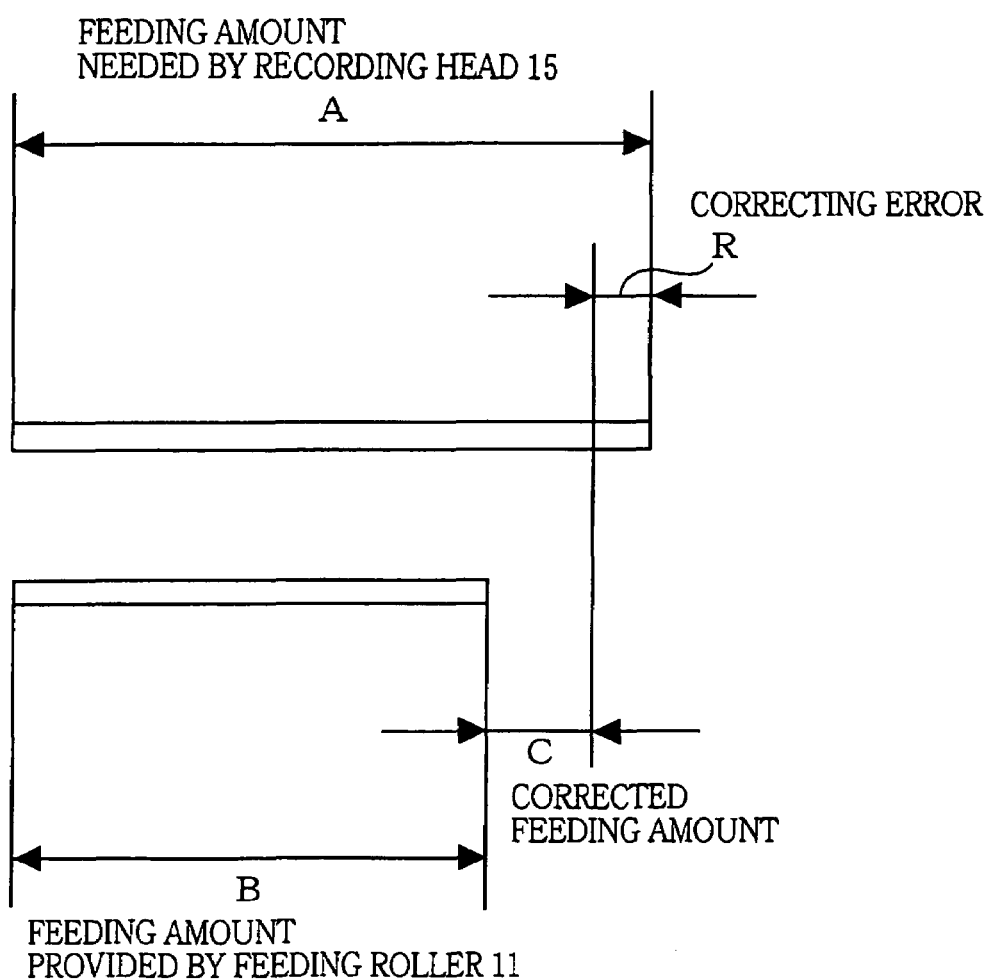
FIG. 8 is a view for explaining a feeding error that is produced when a recording sheet is fed one time in the facsimile apparatus.
Figure 9A:
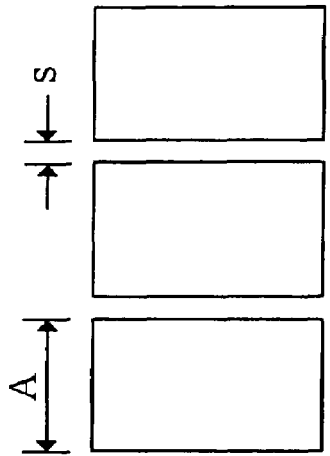
FIG. 9A, FIG. 9B, and FIG. 9C are views for explaining a feeding error that is produced when a recording sheet is fed one time in a conventional ink jet recording device.
Figure 9B:
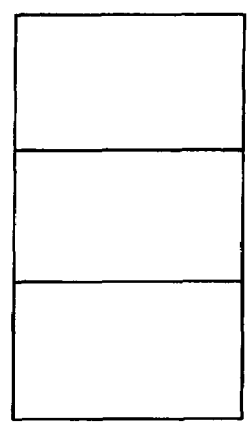
Figure 9C:
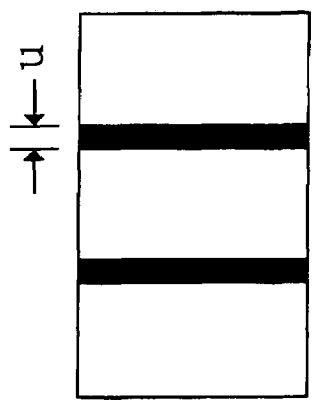

First, a feeding error that is produced in the facsimile apparatus 201 when the recording sheet 100 is fed one time in the feeding direction, and a method for correcting the feeding error is explained by reference to FIG. 8. In FIG. 8, "A" indicates a feeding amount needed by the recording head 15, i.e., a length in the feeding direction of an image-recorded portion of the sheet 100 on which a portion of the image is recorded by one-time movement of the recording head 15 in the recording direction; and "B" indicates a feeding amount provided by the feeding roller 11, i.e., an amount of one-time feeding of the sheet 100 by the feeding roller 11 in the feeding direction caused by a pre-set unit amount (i.e., a reference amount) of operation of the feeding motor 10 (e.g., a stepper motor). The pre-set unit amount of operation of the feeding motor 10 corresponds to a reference diameter of the feeding roller 11. Hereinafter, "A" is referred to as the "head-record length" A; and "B" is referred to as the "roller-feed amount" B.

Since the array of recording elements of the recording head 15 has its manufacturing error and the feeding roller 11 has also its manufacturing error, a feeding error, C+R (=A−B, where A>B), is produced between an actual head-record length A and an actual roller-feed amount B. This problem is solved by the present invention, as follows: A set of information representing the actual head-record length A and a set of information representing the actual roller-feed amount B are obtained in advance, and a difference between the two sets of information is calculated. Then, in order to minimize the feeding error, the pre-set unit amount of operation of the feeding motor 10 as the drive source for rotating the feeding roller 11 is so modified as to correct the amount of one-time feeding of the recording sheet 100 in the feeding direction. For example, in the case where the feeding motor 10 is a stepper motor, the number of drive pulse signals to rotate the stepper motor 10 is increased (A>B), or decreased (A<B).

FIG. 8 shows an example in which the actual head-record length A is greater than the actual roller-feed amount B, i.e., A>B. Therefore, the number of drive pulse signals to rotate the stepper motor 10 is increased. In the figure, "C" indicates an increased amount of feeding of the recording sheet 100 that is caused by the increased amount of operation of the feeding motor 10.

This corrected feeding amount C is equal to a product of an integer and the smallest unit amount of the recording sheet 100 that can be fed by the feeding roller 11 or the feeding motor 10. Therefore, a correction-related error (hereinafter, referred to as "correcting error"), R (=A−(B+C)), may be left even if the corrected feeding amount C may be added to the actual roller-feed amount B. However, since this correcting error R is smaller than the smallest unit amount of feeding of recording sheet 100, the error R does not damage the definition or clearness of the image recorded on the recording sheet 100, Thus, a satisfactory image is recorded on the sheet 100.

Since the amount of feeding of the recording sheet 100 is corrected as described above, no image-spaced portion, i.e., no white line, or no image-overlapped portion, i.e., no black line is produced between an image-recorded portion of the sheet 100 on which a portion of the image is recorded by one-time movement of the recording head 16 in the recording direction and the next image-recorded portion of the sheet 100 on which the next portion of the image is recorded by the next one-time movement of the head 15. Thus, the image recorded on the recording sheet 100 enjoys a high degree of quality.

Next, the control system of the facsimile apparatus 201 will be described by reference to a diagrammatic view shown in FIG. 3. This control system is operable by the user through operation of the panel interface 19, so as to control the feeding of recording sheet 100, and the recording of received image, based on facsimile data received via the telephone line. In addition, the control system is operable by the user so as to read, in response to a user's facsimile-transmission command to transmit an image recorded on an original inserted in the original insertion portion 204, the image from the original. This control system is essentially provided by a microcomputer including a CPU (central processing unit) 2, a ROM (read only memory) 3, and a RAM (random access memory) 4, and the microcomputer is connected via a bus 1 to ASIC (application specific integrated circuit) 8.

A described above, the feeding device that feeds the recording sheet 100 in the feeding direction includes the feeding roller 11 and the feeding motor 10 as the drive source that drives or rotates the feeding roller 11 to feed the sheet 100. The feeding roller 11 is connected to the feeding motor 10 and, when the feeding roller 11 is rotated by the feeding motor 10, the recording sheet 100 is fed in the feeding direction.

In addition, the CPU 2 that produces and outputs an operation-amount control command; the ASIC 8 that produces and outputs a control signal, i.e., a PWM (pulse width modulation) signal based on the operation-amount control command supplied from the CPU 2; and a drive circuit 9 that receives the PWM signal supplied from the ASIC 8 and produces drive pulse signals to rotate the feeding motor 10 cooperate with each other to function as an operation-amount control device which controls an amount of operation of the feeding motor 10 and thereby controls an amount of feeding of the feeding roller 11, and additionally as an operation-amount correcting device which corrects the amount of operation of the feeding motor 10.

The ROM 3 stores various control programs including a communication control program to control a communication operation of the facsimile apparatus 201; various function control programs to control various functions selected by operation of the panel interface 19; and reading and recording control programs to control reading and recording operations as basic facsimile operations. The RAM 4 operates for temporarily storing various sorts of data when the CPU 2 implements each control program.

The ASIC 8 is connected to an NCU (network control unit) 26, and a modem (i.e., a modulator demodulator) 27 demodulates a communication signal that is inputted via the NCU 26 from a public communication line. When image data recorded on an original sheet are transmitted to a remote terminal, the modem 27 modulates the image data into a modulated signal which is then outputted to the public communication line.

In addition, the ASIC 8 produces, in response to respective commands supplied from the CPU 2, respective phase excitation signals (i.e., electric currents) to supply electricity to, e.g., the feeding motor 10 and the carriage motor 13, and supplies those signals to the drive circuit 9 and a drive circuit 12 so that the electric currents are supplied to the feeding motor 10 and the carriage motor 13 via the drive circuits 9, 12. Thus, the ASIC 8 starts and stops the respective operations of the feeding motor 10 and the carriage motor 13.

In addition, the ASIC 8 is connected to the reading portion 18 (e.g., the scanner) that reads an image such as characters on the original sheet inserted in the original insertion portion 204; to the panel interface 19 including the keyboard 20 for the user to operate the facsimile apparatus 201 to transmit, or receive, image data, and additionally including the LCD 21; to an attachable and detachable memory interface 22 including the slot 23 in which a magnetic disc on which to-be-transmitted data or received data are recorded is insertable; and to the parallel interface 24 and the USB interface 26 that are connectable to an external device such as a PC so as to transmit and receive data to and from the external device.

Moreover, the ASIC 8 is connected to the sensor 5 which detects the position of the recording sheet 100 supplied from the sheet stacker 202; to a rotary encoder 6 which is associated with the feeding roller 11 or the feeding motor 10 so as to detect an amount of rotation of the feeding roller 11; and to a linear encoder 7 to detect an amount of linear movement of the carriage 14 in the recording direction.

The drive circuit 9 is for driving the feeding motor 10 connected to the feeding roller 11 and, when the drive circuit 9 drives the feeding motor 10, the recording sheet 100 is fed in the feeding direction. The drive circuit 12 is for driving the carriage motor 13 for moving the carriage 14 on which the recording head 15 is mounted, in the recording direction and, when the drive circuit 12 drives the carriage motor 13, the carriage 14 is moved in the recording direction and accordingly the recording head 15 mounted on the carriage 14 is moved in the same direction.

A drive circuit 16 is for moving the recording head 15 upward and downward in a direction in which the head 15 is opposed to the recording sheet 100, and for driving, at an appropriate timing, each one of the recording elements of the head 15 to output an ink toward the recording sheet 100. Based on an operation control command supplied from the CPU 2, the ASIC 8 produces a control signal and supplies it to the drive circuit 16 so as to drive and control the recording head 15.

Next, there will be described an operation-amount controlling operation for controlling an amount of operation of the feeding motor 10, and an operation-amount correcting operation for correcting the amount of operation of the feeding motor 10, each of the two operations being carried out as part of a sheet feeding operation that is performed under control of the CPU 2 according to the flow chart shown in FIG. 4. The sheet feeding operation is started, for example, when the facsimile apparatus 201 receives image data from another facsimile apparatus via the public communication line and the NCU 26. If this operation is started, first, a recording sheet 100 is supplied from the sheet stacker 202 shown in FIG. 1, into the interior portion of the facsimile apparatus 201, at Step S01 (hereinafter, "step" is omitted) shown in FIG. 4. Subsequently, the CPU 2 sets various parameters and initializes various variables at S02. The parameter setting operation is carried out according to the flow chart shown in FIG. 5A, and the variable initializing operation is carried out according to the flow chart shown in FIG. 5B.

Figure 5A:
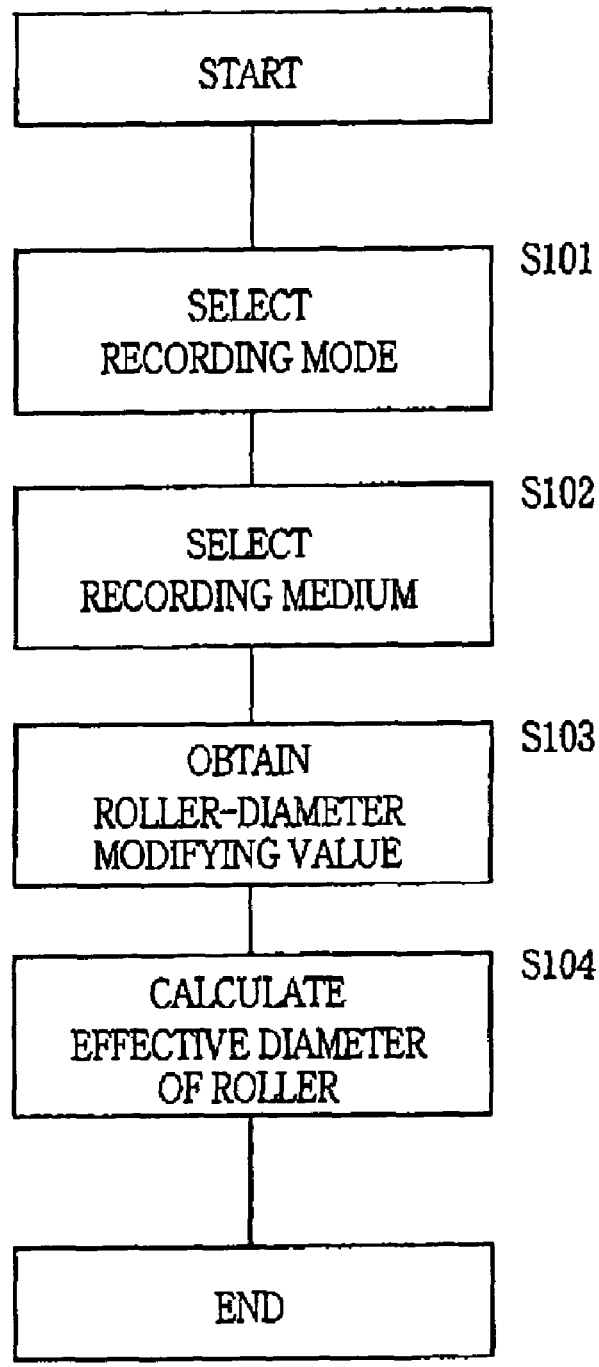
FIG. 5A is a flow chart representing a setting operation carried out as part of the recording-sheet feeding operation shown in FIG. 4.

First, at S101 of FIG. 5A, the user selects a desired recording mode through operation of the recording-mode selecting key on the keyboard 20 and, then, at S102, the user selects a desired sort of recording medium through operation of the recording-medium selecting key on the keyboard 20. Subsequently, at S103, the CPU 2 obtains a roller-diameter modifying value corresponding to the sort of recording medium selected at S102. When the same feeding roller 11 is rotated by a unit amount or angle to feed each of different sorts of recording media, such as a plain-paper sheet, a glossy-paper sheet, and an OHP sheet, respective actual amounts of feeding of those recording media more or less differ from each other because of, e.g., slipping. Hence, respective roller-diameter modifying values that correspond to the different sorts of recording media, respectively, and modify a measured diameter of the feeding roller 11 to make the respective actual amounts of feeding of those recording media equal to each other, are experimentally obtained in advance, and are stored in the ROM 3. Therefore, at S103, the CPU 2 reads, from the ROM 3, the roller-diameter modifying value corresponding to the sort of recording medium selected at S102. Then, at S104, the CPU 2 calculates an effective diameter of the feeding roller 11 by adding, to the measured diameter of the feeding roller 11, the roller-diameter modifying value obtained at S103.

Figure 10:
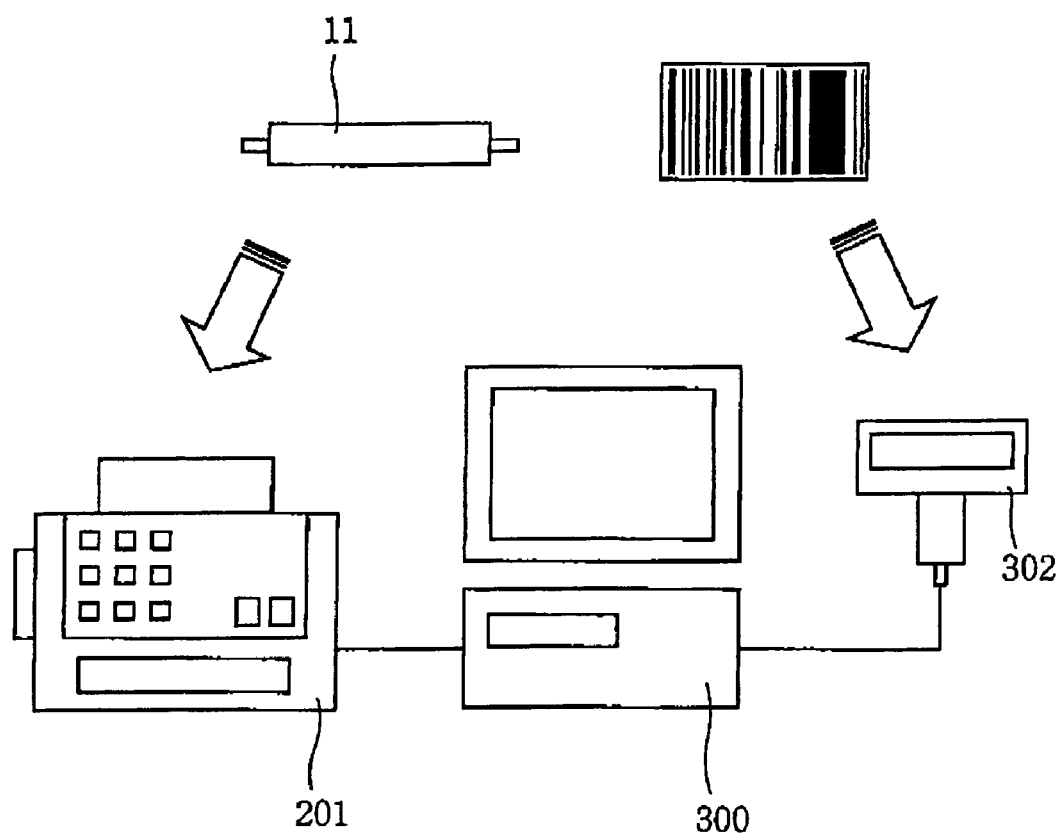
FIG. 10 is a view for explaining a manner in which a diameter of the feeding roller is measured and then is stored in a memory of the control system of the facsimile apparatus of FIG. 1.

Here, a method in which the diameter of the feeding roller 11 is measured is explained by reference to FIG. 10. First, a diameter of a feeding roller 11 is automatically measured using an appropriate measuring device, or is measured by a person using an appropriate tool. The thus measured diameter is represented by a bar code, as shown in FIG. 10. The feeding roller 11 is assembled into the facsimile apparatus 201, and the bar code is read by a bar-code reader 302 into the PC 300 connected to the facsimile apparatus 201, so that the measured diameter of the feeding roller 11 assembled with the facsimile apparatus 201 is stored in the ROM 3 of the same apparatus 201. At S104, the CPU 2 uses the measured diameter of the feeding roller 11 that has been stored in the ROM 3 in this manner.

Figure 5B:
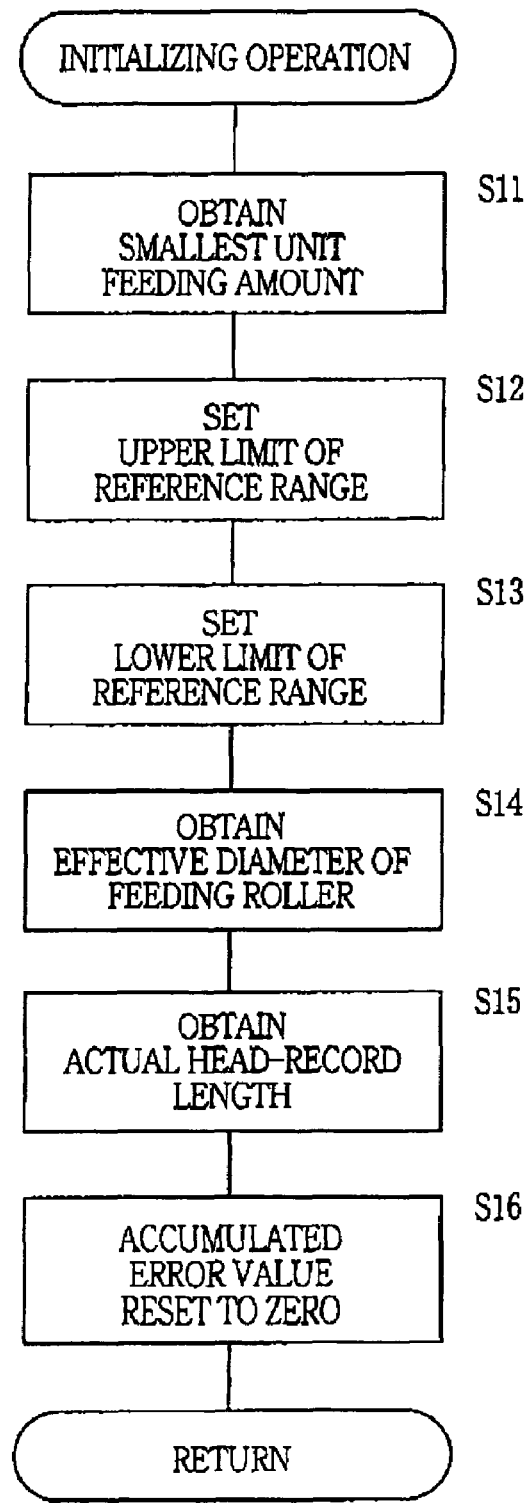
FIG. 5B is a flow chart representing an initializing operation carried out as another part of the recording-sheet feeding operation of FIG. 4.

Next, the CPU 2 carries out the variable initializing operation of FIG. 5B. First, at S11, the CPU 2 obtains the shortest or smallest unit length or amount of recording sheet 100 that can be fed (or adjusted) by the feeding device which includes the feeding roller 11 and the feeding motor 11 that rotates the roller 11, and which feeds the recording sheet 100 in the feeding direction. Since, in the present embodiment, the feeding motor 10 as the drive source for driving or rotating the feeding roller 11 is provided by a stepper motor that is operated in response to each of drive pulses applied thereto, the smallest unit feeding amount means a feeding amount per drive pulse. Next, at S12, the CPU 2 sets an upper limit of a reference range used for comparison with a feeding error and, at S13, the CPU 2 sets a lower limit of the reference range used for comparison with the feeding error. Subsequently, at S14, the CPU 2 obtains information representing an effective diameter of the feeding roller 11. Then, at S15, the CPU 2 obtains information representing an actual length in the feeding direction of an image portion to be formed on the recording sheet 100 by one-time movement of the recording head 15 in the recording direction. Finally, at S16, the CPU 2 resets an accumulated error value to zero.

Here, it is noted that the upper and lower limits of the reference rang are automatically set at S12 and S13 of FIG. 5B according to the recording mode that has been selected at S101 of FIG. 5A by the user through operation of the recording-mode selecting key on the panel interface 19. After the initializing operation is thus carried out at S02 of FIG. 4, then the CPU 2 operates for moving the carriage 14 at S03. At this step, the CPU 2 operates the carriage motor 13 to move the carriage 14 in the recording direction and concurrently operates the recording head 15 to record a first portion of an image on the recording sheet 100.

Subsequently, at S04, the CPU 2 carries out a drive-pulse-number calculating operation for calculating a number of drive pulses to drive the feeding motor 10. This drive-pulse-number calculating operation is carried out according to the flow chart shown in FIG. 6. First, at S21, the CPU 2 sets a standard or reference pulse number. The standard pulse number means a number of drive pulses that are applied to the feeding motor 10 (i.e., the stepper motor) to drive or rotate the feeding roller 11 when the actual length in the feeding direction of the array of recording elements of the recording head 15 and the effective diameter of the feeding roller 11 for feeding the recording sheet 100 in the feeding direction are equal to respective designed values.

Then, at S22, the CPU 2 calculates an actual feeding amount A that is needed by the recording head 15. The actual feeding amount A needed by the recording head 15 means the actual length in the feeding direction of the image portion recorded on the recording sheet 100 by one-time movement of the recording head 15 in the recording direction. The actual length of the array of recording elements cannot always be equal to the designed value because of, e.g., manufacturing errors. Hence, before the recording sheet 100 is fed in the feeding direction, the CPU 2 calculates, in advance, the actual feeding amount A based on the manufacturing errors pre-stored in the ROM 3. The actual feeding amount A may be obtained as an actual length of the array of recording elements of the recording head 15 in the feeding direction that is measured in advance and stored in the ROM 3. The thus calculated or obtained actual feeding amount A corresponds to the feeding amount A shown in FIG. 8.

Next, at S23, the CPU 2 calculates an actual feeding amount B based on the effective diameter of the feeding roller 11 for feeding the recording sheet 100 in the feeding direction. This actual feeding amount B means an actual amount of feeding of recording sheet 100 in the feeding direction that corresponds to the effective diameter of the feeding roller 11. More specifically described, the CPU 2 calculates, based on the effective diameter of the feeding roller 11, an actual amount of feeding of recording sheet 100 that is caused by the feeding roller 11 when the standard number of drive pulses are applied to the feeding motor 10 to drive the same 10.

Then, at S24, the CPU 2 calculates, based on a difference between the calculated actual feeding amount A needed by the recording head 15 and the calculated actual feeding amount B corresponding to the effective diameter of the feeding roller 11, a differential pulse number. The differential pulse number means a number of drive pulses that is added to, or subtracted from, the standard pulse number to be applied to the feeding motor 10, for the purpose of compensating for the difference between the two actual feeding amounts A, B. For example, regarding the case shown in FIG. 8 in which the actual feeding amount B provided by the feeding roller 11 is smaller than the actual feeding amount A needed by the recording head 15, the feeding amount B provided by the feeding roller 11 is short by an amount equal to (A−B), and accordingly a differential pulse number is added to the standard pulse number.

Assuming that the smallest unit feeding amount caused by the smallest-unit-angle rotation of the feeding roller 11 when one drive pulse is applied to the feeding motor 10 is Ar, the differential pulse number is obtained by first dividing the actual feeding amount difference (A−B) by the smallest-unit or one-pulse feeding amount Ar, and then rounding off the decimal of the obtained quotient. Subsequently, at S25, the CPU 2 calculates a corrected feeding amount C caused by rotation of the feeding roller 11 when the feeding motor 10 is operated by the differential pulse number. The corrected feeding amount C caused by the differential pulse number corresponds to the corrected feeding amount C shown in FIG. 8.

Figure 7:
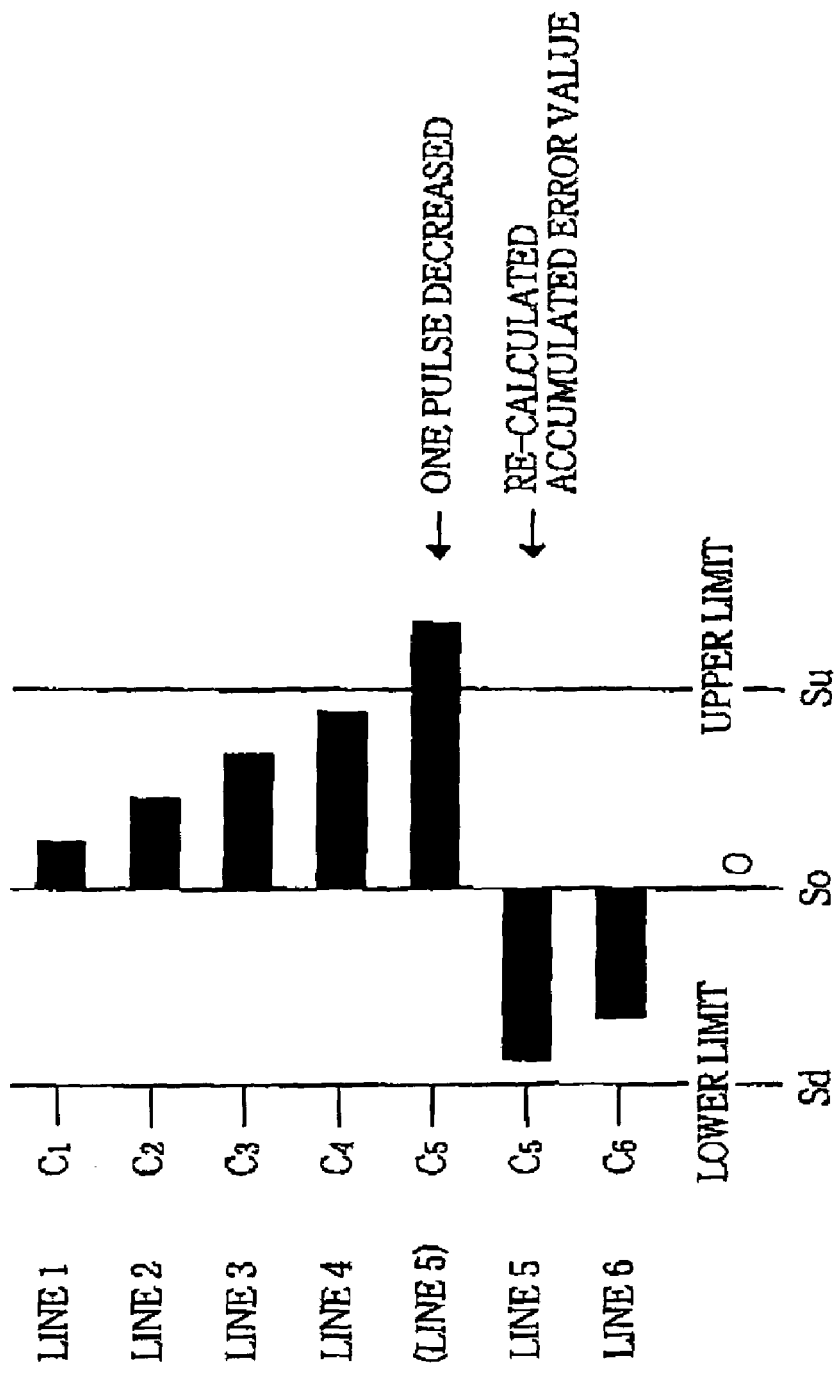
FIG. 7 is a view for explaining a result of the drive-pulse-number calculating step shown in FIG. 6.

Then, at S26, the CPU 2 calculates a unit error R based on the respective feeding amounts A, B and the corrected feeding amount C. The unit error R corresponds to the correcting error R shown in FIG. 8, and is obtained according to the following expression: R=A−(B+C). Subsequently, at S27, the CPU 2 calculates an accumulated error value based on the unit error R calculated at S26 in the current control cycle and one or more unit errors R calculated at S26 in all the past control cycles after the sheet feeding operation is started according to the flow chart of FIG. 4. The accumulated error value is basically equal to the product of the unit error R and one plus the number of past feeding operations of the recording sheets 100 by the feeding roller 11. FIG. 7 shows that the accumulated error value, indicated at "black bar", increases each time the recording sheet 100 is fed in the feeding direction. More specifically described, before the first image portion or line C1 is recorded, the unit error R is calculated as the accumulated error value; and before each of the second, third, and fourth image portions or lines C2, C3, C4 is recorded, the unit error R is simply added, one unit by one, to the accumulated error value.

Next, at S28, the CPU 2 compares the accumulated error value calculated at S27, with the upper limit value of the reference range, set at S12 of FIG. 5B. If the accumulated error value is greater than the upper limit value, the control of the CPU 2 goes to S29 to subtract one from the standard pulse number. On the other hand, if the accumulated error value is not greater than the upper limit value, the control of the CPU 2 goes to S30 to compare the accumulated error value with the lower limit value of the reference range, set at S13 of FIG. 5B. If the accumulated error value is smaller than the lower limit value, the control of the CPU 2 goes to S31 to add one to the standard pulse number. On the other hand, if the accumulated error value is not smaller than the lower limit value, the control of the CPU 2 goes to S32 to add zero to the standard pulse number and then goes to S33 to re-calculate an accumulated error value In this case, the accumulated error value is not changed. After one is subtracted from the standard pulse number at S29, or after one is added to the standard pulse number at S31, the control of the CPU 2 also goes to S33 to re-calculate an accumulated error value. In the former case, a value corresponding to one pulse is subtracted from the accumulated error value; and in the latter case, the value corresponding to one pulse is added to the accumulated error value.

Then, at S34, the CPU 2 calculates a number of drive pulses to be applied to the feeding motor 10. More specifically described, the CPU 2 first adds (or subtracts), to (or from) the standard pulse number set at S21, the differential pulse number calculated at S24 and then subtracts one determined at S29, adds one determined at S31, or adds zero determined at S32, from or to the thus obtained pulse number. S27 through S33 will be described below in more detail by reference to FIG. 7.

FIG. 7 shows the case where the accumulated error value gradually increases. In FIG. 7, "Su" indicates the upper limit of the reference range; "Sd" indicates the lower limit of the reference range; and "So" indicates the middle value of the reference range, i.e., no error. In the present embodiment, the upper limit "Su" is equal to the product of +½ and the smallest unit amount of recording sheet 100 in the feeding direction that can be fed by the feeding device; and the lower limit "Su" is equal to the product of −½ and the smallest unit feeding amount.

Figure 6:
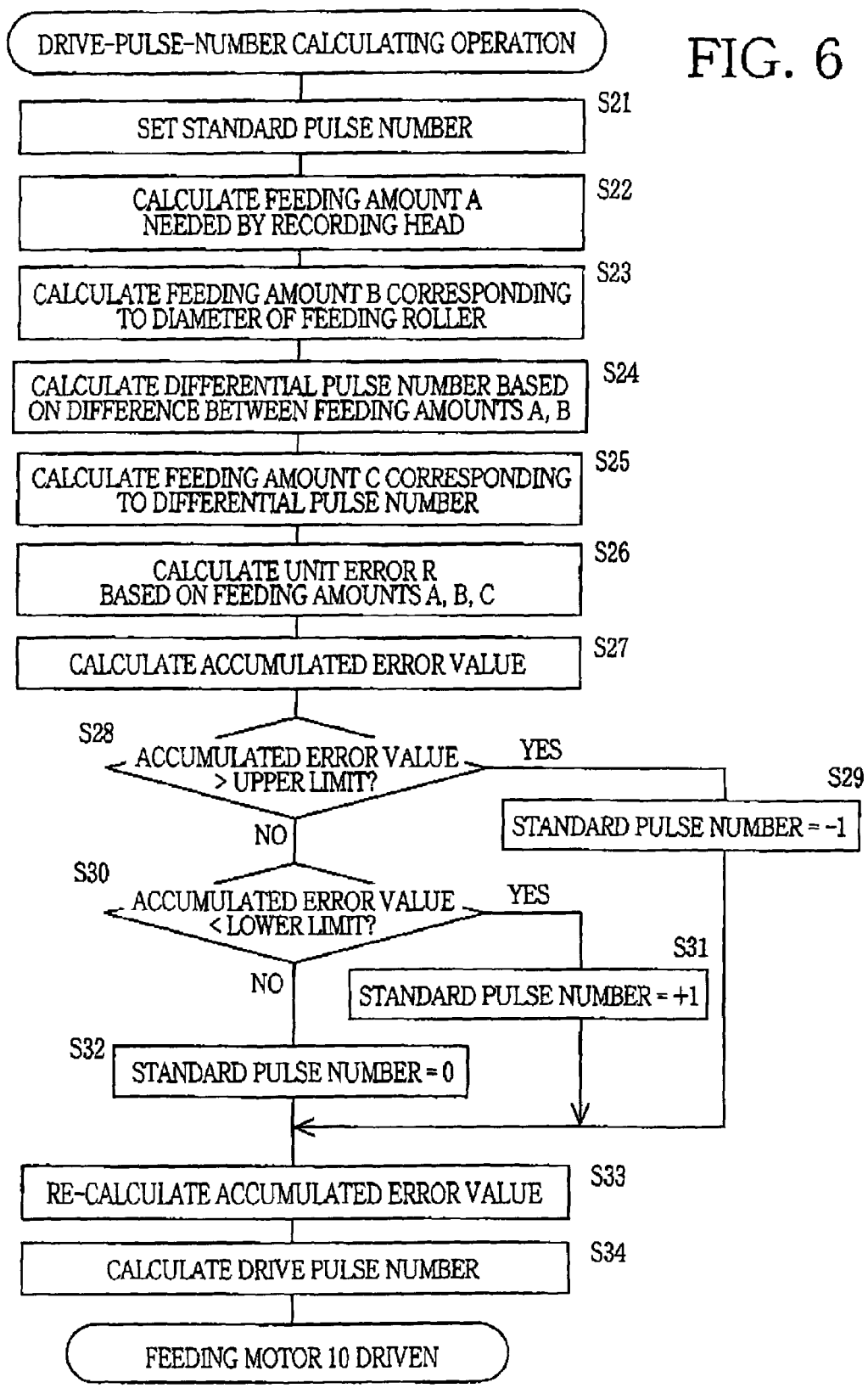
FIG. 6 is a flow chart representing a drive-pulse-number calculating operation carried out as another part of the recording-sheet feeding operation of FIG. 4.

Before each of the first to fourth image lines C1 through C4 is recorded, the corresponding accumulated error value is calculated and is found as being between the lower limit Sd and the upper limit Su, and accordingly the control of the CPU 2 goes, in the flow chart shown in FIG. 6, to S27, S30, S32, and S33 in the order of description. Before the fifth image line C5 is recorded, however, the corresponding accumulated error value is found to be greater than the upper limit Su and accordingly the control of the CPU 2 goes to S29 to subtract one from the standard pulse number and then goes to S33 to re-calculate an accumulated error value by subtracting, from the accumulated error value calculated at S27, the smallest unit feeding amount corresponding to one pulse. Therefore, the accumulated error value re-calculated at S33 is not smaller than the lower limit Sd. Thereafter, when the sixth image line C6 is recorded, the corresponding accumulated error value increases again by the unit error R. Thus, each time a new image line is recorded, the CPU 2 judges whether the corresponding accumulated error value falls between the upper and lower limits of the reference range and determines a number of drive pulses to drive or operate the feeding motor 10, such that the re-accumulated error value obtained at S33 of FIG. 6 falls in the reference range.

Figure 4:
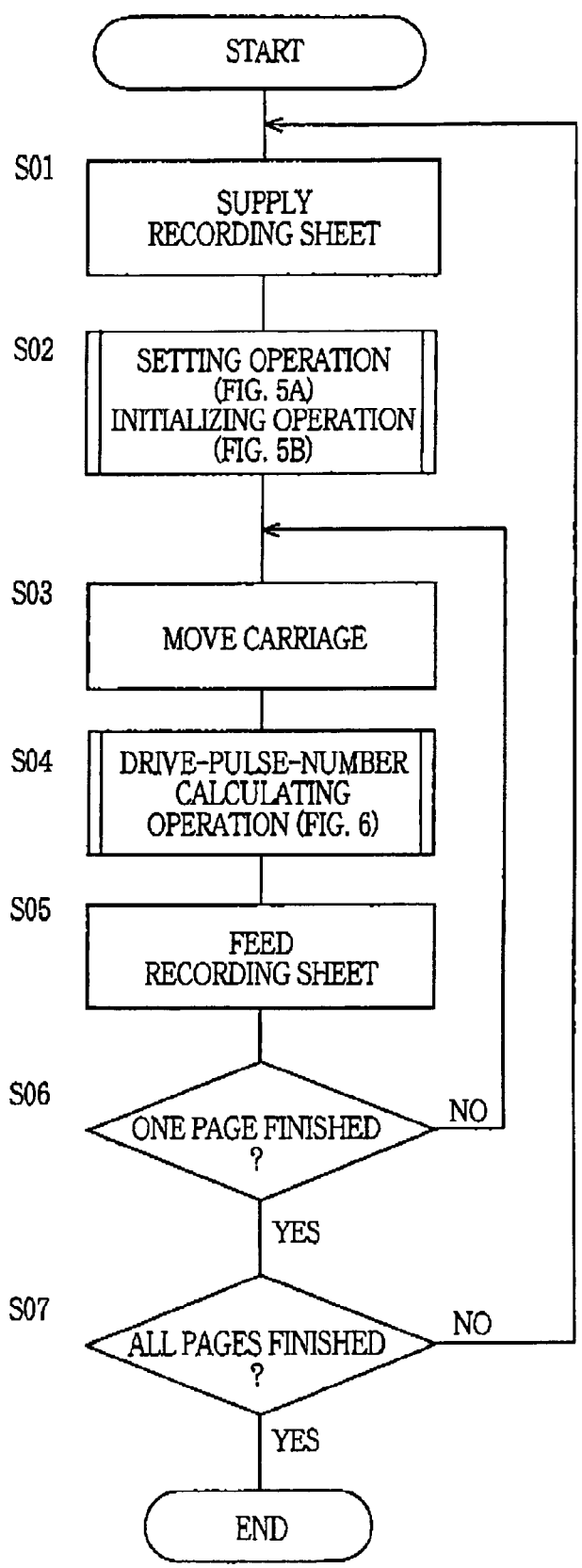
FIG. 4 is a flow chart representing a recording-sheet feeding operation carried out under control of a CPU (central processing unit) of a control system of the facsimile apparatus.

After the drive-pulse-number calculating operation is carried out at S04 of FIG. 4, the CPU 2 applies, at S05, the thus calculated drive pulse number to the feeding motor 10 so as to rotate the feeding roller 11 and thereby feed the recording sheet 100 in the feeding direction.

Next, at S06, the CPU 2 judges whether the recording of image on one page, i.e., one recording sheet 100 has been finished. If a negative judgment is made at S06, then the control goes back to S03 to move the carriage 14 in the recording direction and repeats S04 through S06. Meanwhile, if a positive judgment is made at S06, the control goes to S07 to judge whether recording of images on all pages, i.e., needed recording sheets 100 has been finished. If a negative judgment is made at S07, then the control goes back to S01 to supply a new recording sheet 100 and repeats S02 through S07. Meanwhile, if a positive judgment is made at S07, the CPU 2 quits the sheet feeding operation according to the flow chart of FIG. 4.

As is apparent from the foregoing description of the preferred embodiment of the present invention, the facsimile apparatus 201 obtains, in advance, a set of information representing the actual amount of one-time feeding of recording sheet 100 by the feeding roller 11 in the feeding direction, and a set of information representing the actual length in the feeding direction of image (or image portion) recorded on the recording sheet 100 by one-time movement of the recording head 15 in the recording direction. Based on the thus obtained sets of information, the facsimile apparatus 201 controls the drive pulse number applied to the feeding motor 10, i.e., the amount of operation of the feeding motor 10, according to the control programs stored in the ROM 3, so that the actual amount of one-time feeding of recording sheet 100 by the feeding roller 11 in the feeding direction is substantially equal to the actual length in the feeding direction of the image recorded by one-time movement of the recording head 15. Therefore, an image-spaced portion, i.e., a white line or an image-overlapped portion, i.e., a black line does not occur between an image portion formed by one-time movement of the recording head 15 in the recording direction and the next image portion formed by the next one-time movement of the head 16. Thus, the image recorded on the recording sheet 100 enjoys a high degree of quality.

Also, in the above-described embodiment, the facsimile apparatus 201 corrects, each time before the feeding roller 11 feeds the recording sheet 100, the drive pulse number used to drive the feeding motor 10, so that the actual amount of one-time feeding of recording sheet 100 by the feeding roller 11 in the feeding direction is made substantially equal to the actual length in the feeding direction of the image recorded by one-time movement of the recording head 15. Therefore, an image-spaced portion or an image-overlapped portion does not occur between two image portions successively formed by respective movements of the recording head 15 in the recording direction. Thus, the image recorded on the recording sheet 100 enjoys a high degree of quality.

Also, in the illustrated embodiment, the facsimile apparatus 201 calculates, each time the feeding roller 11 is driven to feed the recording sheet 100, an accumulated error value based on an amount of one-time feeding of recording sheet 100 by the feeding roller 11 in the feeding direction and a length in the feeding direction of an image portion recorded by one-time movement of the recording head 15, and corrects the drive pulse number to be applied to the feeding motor 10, so that the accumulated error value does not go beyond the reference range. Therefore, even if the recording sheet 100 may be iteratively fed a great number of times in the feeding direction, no image-spaced portion or no image-overlapped portion occurs between two image portions successively formed by respective movements of the recording head 15 in the recording direction Thus, the image recorded on the recording sheet 100 enjoys a high degree of quality.

In the illustrated embodiment, the drive source for driving or operating the feeding motor 10 is provided by the stepper motor, and the amount of operation of the stepper motor is controlled using the number of drive pulses applied thereto. However, the stepper motor may be replaced with a DC motor. In the case where the drive source is provided by the DC motor, it is possible to employ a rotary encoder that detects an angle or amount of rotation of the DC motor (or the feeding roller 11) and determine a total amount of rotation of the feeding roller 11 by counting a number of pulse signals each of which is outputted by the rotary encoder each time the rotary encoder detects every pre-set angle of rotation of the DC motor (or the feeding roller 11). In this case, when the detected total amount of rotation of the feeding roller 11 reaches a target amount, the facsimile apparatus 201 stops the operation of the DC motor. The target amount may be increased or decreased by the CPU 2 of the microcomputer to compensate for the feeding error shown in FIG. 8. In addition, a rotary encoder may be used to produce a first pulse signal and a second pulse signal that have a phase difference. In the latter case, a user can arbitrarily select an appropriate one of a plurality of different coefficients to determine respective timings of leading and trailing ends of each of the two pulse signals, so as to change the smallest unit amount of feeding of recording sheet by the feeding roller 11. Thus, the image recorded on the recording sheet 100 can enjoy high degrees of efficiency and definition suitable for its application.

While the illustrated embodiment relates to the facsimile apparatus 201, the present invention is applicable to other sorts of image recording apparatuses than the facsimile apparatus, such as a printer, so long as those image recording apparatuses are of serial recording type.

The invention further includes, as another aspect, the control program, represented by the flow charts of FIGS. 4, 5A, 5B, and 6, that can be executed by the control system (i.e., the microcomputer) shown in FIG. 3 to control the facsimile apparatus 201 shown in FIG. 1. The control program can be provided as a computer-readable computer program product, such as a computer-readable recording medium on which the computer program is recorded, or it may be a transmittable carrier wave in which the control program is embodied as a data signal. The control program can be implemented in the ASIC 8 shown in FIG. 3. The control program can be transmitted by a carrier wave over a communications network such as the World Wide Web and/or transmitted in a wireless fashion, for example, by radio waves or by infrared waves. The control program can also be transmitted from a remote storage facility to a local control unit. In such an arrangement, the local control unit interacts with the remote storage facility to transfer all or part of the control program, as needed, for execution by the local unit. Accordingly, the local unit does not require a large amount of memory capacity. The computer-readable recording medium can be, e.g., a CD-ROM, a computer hard drive, a RAM, or other types of memories that are readily removable from, or intended to remain fixed within, the computer.

While the present invention has been described in detail in its embodiments, it is to be understood that the present invention is not limited to the details of those embodiments and may be embodied with various changes and improvements, such as those described in SUMMARY OF THE INVENTION, which may occur to a person skilled in the art.

What is claimed is:

1. A serial recording apparatus, comprising:
 a feeding device including a feeding roller and a drive source which rotates the feeding roller and thereby feeds a recording medium in a feeding direction;
 a recording head which records an image on the recording medium when the recording head is moved in a recording direction substantially perpendicular to the feeding direction and includes at least one array of recording elements arranged in a direction intersecting the recording direction;

a non-volatile memory in which at least one of (a) first information representing a length of the array of recording elements in the feeding direction which length contains a manufacturing error of the array of recording elements and (b) second information representing a diameter of the feeding roller which diameter contains a manufacturing error of the feeding roller is stored, wherein the at least one of (a) the first information and (b) the second information is predetermined by a manufacturer of the serial recording apparatus before being stored in the memory; and a control device which controls, based on said at least one of (a) the first information and (b) the second information, an amount of operation of the drive source, and thereby controls an amount of feeding of the recording medium in the feeding direction.

2. The apparatus according to claim 1, further comprising a recording-mode selecting device which is operable to select one of a plurality of recording modes corresponding to different resolutions of recording.

3. The apparatus according to claim 1, wherein the recording head comprises an ink jet recording head including at least one array of ink jet recording elements each of which outputs an ink toward the recording medium to record the image thereon.

4. The apparatus according to claim 1, wherein the memory stores (a) the first information representing a measured length of the array of recording elements in the feeding direction.

5. The apparatus according to claim 1, wherein the memory stores (a) the first information representing a designed value, and the manufacturing error, of the array of recording elements in the feeding direction.

6. The apparatus according to claim 1, wherein the memory stores (b) the second information representing a measured diameter of the feeding roller.

7. The apparatus according to claim 1, wherein the memory stores (b) the second information representing a designed value, and the manufacturing error, of the feeding roller.

8. A serial recoding apparatus, comprising:

a feeding device including a feeding roller and a drive source which rotates the feeding roller and thereby feeds a recording medium in a feeding direction;

a recording head which records an image on the recording medium when the recording head is moved in a recording direction substantially perpendicular to the feeding direction and includes at least one array of recording elements arranged in a direction intersecting the recording direction; and a control device which controls, based on a length of the array of recording elements in the feeding direction and an effective diameter of the feeding roller, an amount of operation of the drive source, and thereby controls an amount of feeding of the recording medium in the feeding direction, wherein the control device comprises a correcting portion which modifies, based on a sort of the recording medium, a measured diameter of the feeding roller into the effective diameter, determines a difference between the length of the array of recording elements in the feeding direction and a provisional amount of feeding of the recording medium obtained based on the effective diameter of the feeding roller and a reference amount of operation of the drive source, and corrects, based on the determined difference, the reference amount of operation of the drive source into a corrected amount of operation of the drive source, so that the feeding device feeds the recording medium by a corrected feeding amount corresponding to the corrected amount of operation of the drive source.

9. A serial recording apparatus, comprising:

a feeding device including a feeding roller and a drive source which rotates the feeding roller and thereby feeds a recording medium in a feeding direction;

a recording head which records an image on the recording medium when the recording head is moved in a recording direction substantially perpendicular to the feeding direction and includes at least one array of recording elements arranged in a direction intersecting the recording direction; and a control device which controls, based on a length of the array of recording elements in the feeding direction and an effective diameter of the feeding roller, an amount of operation of the drive source, and thereby controls an amount of feeding of the recording medium in the feeding direction, each time the feeding device feeds the recording medium in the feeding direction, wherein the control device comprises a correcting portion which determines, each time the feeding device feeds the recording medium, a difference by subtracting the length of the array of recording elements from a provisional amount of feeding of the recording medium obtained based on the effective diameter of the feeding roller and a reference amount of operation of the drive source, divides the determined difference by a smallest unit amount of the recording medium that can be fed by the feeding device, into an integer as a quotient and a unit error whose absolute value is smaller than the smallest unit amount of feeding of the recording medium, determines an accumulated error of feeding of the recording medium by the feeding device relative to the recording head, and corrects the reference amount of operation of the drive source into a corrected amount of operation of the drive source, so that the feeding device feeds the recording medium by a corrected feeding amount corresponding to the corrected amount of operation of the drive source and the accumulated error falls in a reference range, wherein the correcting portion determines the accumulated error which is equal to a product of the unit error and one plus a number of times by which the feeding device has fed the recording medium, and wherein when the accumulated error is greater than an upper limit of the reference range, the correcting portion corrects the reference amount of operation of the drive source, by subtracting, from the reference amount of operation of the drive source, a first correction amount of operation of the drive source corresponding to a first product of a first positive integer and the smallest unit amount of feeding of the recording medium and, when the accumulated error is smaller than a lower limit of the reference range, the correcting portion corrects the reference amount of operation of the drive source, by adding, to the reference amount of operation of the drive source, a second correction amount of operation of the drive source corresponding to a second product of a second positive integer and the smallest unit amount of feeding of the recording medium, and wherein the correcting portion updates the accumulated error, by subtracting, when the accumulated error is greater than the upper limit of the reference range, the first product from the accumulated error and adding, when the accumulated error is smaller than the lower limit of the reference range, the second product to the accumulated error.

10. The apparatus according to claim 9, wherein each time before the feeding device feeds the recording medium, the correcting portion determines the accumulated error, and corrects, when the determined accumulated error does not fall in the reference range, the reference amount of operation of the drive source into the corrected amount of operation of the drive source.

11. The apparatus according to claim 9, wherein the upper limit of the reference range is equal to a product of +½ and the smallest unit amount of feeding of the recording medium, and the lower limit of the reference range is equal to a product of −½ and the smallest unit amount of feeding of the recording medium.

12. The apparatus according to claim 11, wherein each of the first and second integers is equal to 1, wherein when the accumulated error is greater than the upper limit of the reference range, the correcting portion corrects the reference amount of operation of the drive source, by subtracting, from the reference amount of operation of the drive source, the first correction amount of operation of the drive source corresponding to the smallest unit amount of feeding of the recording medium and, when the accumulated error is smaller than the lower limit of the reference range, the correcting portion corrects the reference amount of operation of the drive source, by adding, to the reference amount of operation of the drive source, the second correction amount of operation of the drive source corresponding to the smallest unit amount of feeding of the recording medium, and wherein the correcting portion updates the accumulated error, by subtracting, when the accumulated error is greater than the upper limit of the reference range, the first product equal to the smallest unit amount of feeding of the recording medium, from the accumulated error and adding, when the accumulated error is smaller than the lower limit of the reference range, the second product equal to the smallest unit amount of feeding of the recording medium, to the accumulated error.

13. A serial recording method, comprising the steps of
feeding, with a feeding roller and a drive source which rotates the feeding roller, a recording medium in a feeding direction,
recording, with a recording head, an image on the recording medium when the recording head is moved in a recording direction substantially perpendicular to the feeding direction, the recording head including at least one array of recording elements arranged in a direction intersecting the recording direction, and
controlling, based on a length of the array of recording elements in the feeding direction and an effective diameter of the feeding roller, an amount of operation of the drive source, and thereby controlling an amount of feeding of the recording medium in the feeding direction,
wherein the step of controlling comprises modifying, based on a sort of the recording medium, a measured diameter of the feeding roller into the effective diameter, determining a difference between the length of the array of recording elements in the feeding direction and a provisional amount of feeding of the recording medium obtained based on the effective diameter of the feeding roller and a reference amount of operation of the drive source, and correcting, based on the determined difference, the reference amount of operation of the drive source into a corrected amount of operation of the drive source, so that the recording medium is fed by a corrected feeding amount corresponding to the corrected amount of operation of the drive source.

14. The method according to claim 13, wherein the step of recording comprises recording the image on the recording medium, with an ink jet recording head including at least one array of ink jet recording elements each of which outputs an ink toward the recording medium.

15. A serial recording method, comprising the steps of
feeding, with a feeding roller and a drive source which rotates the feeding roller, a recording medium in a feeding direction,
recording, with a recording head, an image on the recording medium when the recording head is moved in a recording direction substantially perpendicular to the feeding direction, the recording head including at least one array of recording elements arranged in a direction intersecting the recording direction, and
controlling, based on a length of the array of recording elements in the feeding direction and an effective diameter of the feeding roller, an amount of operation of the drive source, and thereby controlling an amount of feeding of the recording medium in the feeding direction, each time the recording medium is fed in the feeding direction,
wherein the step of controlling comprises determining, each time the recording medium is fed in the feeding direction, a difference by subtracting the length of the array of recording elements from a provisional amount of feeding of the recording medium obtained based on the effective diameter of the feeding roller and a reference amount of operation of the drive source, dividing the determined difference by a smallest unit amount of the recording medium that can be fed by the feeding roller and the drive source, into an integer as a quotient and a unit error whose absolute value is smaller than the smallest unit amount of feeding of the recording medium, determining an accumulated error of feeding of the recording medium relative to the recording head, and correcting the reference amount of operation of the drive source into a corrected amount of operation of the drive source, so that the recording medium is fed by a corrected feeding amount corresponding to the corrected amount of operation of the drive source and the accumulated error falls in a reference range,
wherein the step of determining the accumulated error comprises determining the accumulated error which is equal to a product of the unit error and one plus a number of times by which the recording medium has been fed by the feeding roller and the drive source, and
wherein the step of correcting comprises correcting, when the accumulated error is greater than an upper limit of the reference range, the reference amount of operation of the drive source, by subtracting, from the reference amount of operation of the drive source, a first correction amount of operation of the drive source corresponding to a first product of a first positive integer and the smallest unit amount of feeding of the recording medium and, when the accumulated error is smaller than a lower limit of the reference range, correcting the reference amount of operation of the drive source, by adding, to the reference amount of operation of the drive source, a second correction amount of operation of the drive source corresponding to a second product of a second positive integer and the smallest unit amount of feeding of the recording medium, and updating the accumulated error, by subtracting, when the accumulated error is greater than the upper limit of the reference range, the first product from the accumulated error and adding, when the accumulated error is smaller than the lower limit of the reference range, the second product to the accumulated error.

16. A computer-readable computer program product containing a computer program for carrying out a serial recording method, the method including the steps of feeding, with a feeding roller and a drive source which rotates the feeding roller, a recording medium in a feeding direction, recording, with a recording head, an image on the recording medium when the recording head is moved in a recording direction substantially perpendicular to the feeding direction, the recording head including at least one array of recording elements arranged in a direction intersecting the recording direction, and controlling, based on a length of the array of recording elements in the feeding direction and an effective diameter of the feeding roller, an amount of operation of the drive source, and thereby controlling an amount of feeding of the recording medium in the feeding direction, wherein the step of controlling comprises modifying, based on a sort of the recording medium, a measured diameter of the feeding roller into the effective diameter, determining a difference between the length of the array of recording elements in the feeding direction and a provisional amount of feeding of the recording medium obtained based on the effective diameter of the feeding roller and a reference amount of operation of the drive source, and correcting, based on the determined difference, the reference amount of operation of the drive source into a corrected amount of operation of the drive source, so that the recording medium is fed by a corrected feeding amount corresponding to the corrected amount of operation of the drive source.

17. The product according to claim 16, wherein the step of recording comprises recording the image on the recording medium, with an ink jet recording head including at least one array of ink jet recording elements each of which outputs an ink toward the recording medium.

18. A computer-readable computer program product containing a computer program for carrying out a serial recording method, the method including the steps of feeding, with a feeding roller and a drive source which rotates the feeding roller, a recording medium in a feeding direction, recording, with a recording head, an image on the recording medium when the recording head is moved in a recording direction substantially perpendicular to the feeding direction, the recording head including at least one array of recording elements arranged in a direction intersecting the recording direction, and controlling, based on a length of the array of recording elements in the feeding direction and an effective diameter of the feeding roller, an amount of operation of the drive source, and thereby controlling an amount of feeding of the recording medium in the feeding direction, each time the recording medium is fed in the feeding direction, wherein the step of controlling comprises determining, each time the recording medium is fed in the feeding direction, a difference by subtracting the length of the array of recording elements from a provisional amount of feeding of the recording medium obtained based on the effective diameter of the feeding roller and a reference amount of operation of the drive source, dividing the determined difference by a smallest unit amount of the recording medium that can be fed by the feeding roller and the drive source, into an integer as a quotient and a unit error whose absolute value is smaller than the smallest unit amount of feeding of the recording medium, determining an accumulated error of feeding of the recording medium relative to the recording head, and correcting the reference amount of operation of the drive source into a corrected amount of operation of the drive source, so that the recording medium is fed by a corrected feeding amount corresponding to the corrected amount of operation of the drive source and the accumulated error falls in a reference range, wherein the step of determining the accumulated error comprises determining the accumulated error which is equal to a product of the unit error and one plus a number of times by which the recording medium has been fed by the feeding roller and the drive source, and wherein the step of correcting comprises correcting, when the accumulated error is greater than an upper limit of the reference range, the reference amount of operation of the drive source, by subtracting, from the reference amount of operation of the drive source, a first correction amount of operation of the drive source corresponding to a first product of a first positive integer and the smallest unit amount of feeding of the recording medium and, when the accumulated error is smaller than a lower limit of the reference range, correcting the reference amount of operation of the drive source, by adding, to the reference amount of operation of the drive source, a second correction amount of operation of the drive source corresponding to a second product of a second positive integer and the smallest unit amount of feeding of the recording medium, and updating the accumulated error, by subtracting, when the accumulated error is greater than the upper limit of the reference range, the first product from the accumulated error and adding, when the accumulated error is smaller than the lower limit of the reference range, the second product to the accumulated error.

19. A serial recording apparatus, comprising:

a feeding device including a feeding roller and a drive source which rotates the feeding roller and thereby feeds a recording medium in a feeding direction;

a recording head which records an image on the recording medium when the recording head is moved in a recording direction substantially perpendicular to the feeding direction and includes at least one array of recording elements arranged in a direction intersecting the recording direction;

an information obtaining device which obtains information representing a sort of the recording medium; and a control device which controls, based on the sort of the recording medium, an amount of operation of the drive source, and thereby controls an amount of feeding of the recording medium in the feeding direction, wherein the control device comprises a correcting portion which modifies, based on the sort of the recording medium, a diameter of the feeding roller into an effective diameter, determines a difference between a length of the array of recording elements in the feeding direction and a provisional amount of feeding of the recording medium obtained based on the effective diameter of the feeding roller and a reference amount of operation of the drive source, and corrects, based on the determined difference, the reference amount of operation of the drive source into a corrected amount of operation of the drive source, so that the feeding device feeds the recording medium by a corrected feeding amount corresponding to the corrected amount of operation of the drive source.

20. A serial recording method, comprising the steps of feeding, with a feeding roller and a drive source which rotates the feeding roller, a recording medium in a feeding direction, recording, with a recording head, an image on the recording medium when the recording head is moved in a recording direction substantially perpendicular to the feeding direction, the recording head including at least one array of recording elements arranged in a direction intersecting the recording direction, reading, from a non-volatile memory, at least one of (a) first information representing a length of the array of recording elements in the feeding direction which length contains a manufacturing error of the array of recording head and (b) second information representing a diameter of the feeding roller which diameter contains a manufacturing error of the feeding roller, wherein the at least one of (a) the first information and (b) the second information is predetermined by a manufacturer before being stored in the memory, and controlling, based on said at least one of (a) the first information and (b) the second information, an amount of operation of the drive source, and thereby controlling an amount of feeding of the recording medium in the feeding direction.

21. A computer-readable computer program product containing a computer program for carrying out a serial recording method, the method including the steps of feeding, with a feeding roller and a drive source which rotates the feeding roller, a recording medium in a feeding direction, recording, with a recording head, an image on the recording medium when the recording head is moved in a recording direction substantially perpendicular to the feeding direction, the recording head including at least one array of recording elements arranged in a direction intersecting the recording direction, reading, from a non-volatile memory, at least one of (a) first information representing a length of the array of recording elements in the feeding direction which length contains a manufacturing error of the array of recording head and (b) second information representing a diameter of the feeding roller which diameter contains a manufacturing error of the feeding roller, wherein the at least one of (a) the first information and (b) the second information is predetermined by a manufacturer before being stored in the memory, and controlling, based on said at least one of (a) the first information and (b) the second information, an amount of operation of the drive source, and thereby controlling an amount of feeding of the recording medium in the feeding direction.

* * * * *